United States Patent [19]

Garney

[11] Patent Number: 5,386,552
[45] Date of Patent: Jan. 31, 1995

[54] PRESERVATION OF A COMPUTER SYSTEM PROCESSING STATE IN A MASS STORAGE DEVICE

[75] Inventor: John I. Garney, Aloha, Oreg.
[73] Assignee: Intel Corporation, Santa Clara, Calif.
[21] Appl. No.: 276,778
[22] Filed: Jul. 18, 1994

Related U.S. Application Data

[63] Continuation of Ser. No. 779,642, Oct. 21, 1991, abandoned.

[51] Int. Cl.⁶ .................... G06F 12/00; G06F 11/00; G06F 9/46
[52] U.S. Cl. ..................... 395/575; 395/725; 371/12; 371/14; 371/66
[58] Field of Search ................ 395/575, 725; 371/66, 371/12, 14; 364/931.47

[56] References Cited

U.S. PATENT DOCUMENTS

| | | | |
|---|---|---|---|
| 4,763,333 | 8/1988 | Byrd | 371/66 |
| 4,907,150 | 3/1990 | Arroyo et al. | 364/200 |
| 5,123,098 | 6/1992 | Gunning et al. | 395/400 |
| 5,204,840 | 4/1993 | Mazur | 365/228 |
| 5,255,379 | 10/1993 | Melo | 395/400 |
| 5,276,888 | 1/1994 | Kardach et al. | 395/725 |
| 5,291,604 | 3/1994 | Kardach et al. | 395/725 |
| 5,297,282 | 3/1994 | Meilak et al. | 395/700 |
| 5,303,378 | 5/1991 | Cohen | 395/700 |

*Primary Examiner*—Robert W. Beausoliel, Jr.
*Assistant Examiner*—Norman M. Wright
*Attorney, Agent, or Firm*—Blakely, Sokoloff, Taylor & Zafman

[57] ABSTRACT

A computer system wherein the processing state of the system may be saved and restored on a mass storage device upon the occurrence of a triggering event. The computer system of the present invention comprises a processor and various memory areas and system resources. Main memory includes several areas including a system management area comprising a segment of isolated random access memory within main memory. The system management area may only be accessed while the processor is in a system management interrupt state. The remaining portions of main memory are freely accessible (i.e. non-isolated) by any interrupt or noninterrupt processing logic. The basic approach of the present invention for saving the processing state of a computer system in nonvolatile storage is to: (1) sense a save system state triggering event; (2) write the contents of system registers and memory to a nonvolatile mass storage device; and (3) enter a suspend state and wait for a resume triggering event or power off the computer system completely. The basic approach of the present invention for restoring the processing state of the computer system from nonvolatile memory is to: (1) sense the resumption of processing of the application of power to the computer system; (2) read the contents of a previously save processing state from a nonvolatile mass storage device and restore the contents of memory and computer system registers; and (3) return control to the previously running application program.

22 Claims, 20 Drawing Sheets

(SAVE SYSTEM STATE)

(SAVE SYSTEM STATE)

(SAVE SYSTEM STATE)

(RESTORE SYSTEM STATE)

PRESERVATION OF A COMPUTER SYSTEM PROCESSING STATE IN A MASS STORAGE DEVICE

This is a continuation of application Ser. No. 07/779,642, filed Oct. 21, 1991, now abandoned.

BACKGROUND OF THE INVENTION

1. Field of the Invention

The present invention relates to the field of computer systems. Specifically, the present invention relates to the field of preserving the processing state of computer system having a volatile form of memory and/or registers.

2. Related Art

Computer systems encounter many situations where some level of system state preservation is necessary. Several examples of such situations include basic interrupt processing, context switching, and low power operations. Basic interrupt processing involves the suspension of processing at a first location and transfer of processing to a second location upon the occurrence of some interrupting event. Prior to transfer to the second location, several system and processor parameters and registers (collectively known as processor state) are preserved by being pushed onto a stack typically located in random access memory (RAM). Upon return from the interrupt, the processor state may be popped from the stack and processing control may return to a position following the location at which the interrupt occurred. In the basic interrupt model, processor state information is saved and restored; however, the entire system state including the contents of memory and the condition of system resources and peripherals is not saved. Moreover, the use of a stack in RAM for retention of processor state during a basic interrupt does not provide protection against the loss of power to the random access memory sub-system.

Many multi-tasking and multi-user systems use a technique called context switching for transferring processing control from one task or user (collectively known as a process) to a different process. Each process operates within a processing environment or context defined by a number of parameters, registers, and/or regions of random access memory associated with that process. Prior to switching from a first process to a second process, the context associated with the first process is preserved and the context associated with the second process is retrieved. Context information is typically stored in a stack in random access memory. Similar to the situation with basic interrupt processing, the preservation of system state for context switching does not save the entire state of the computer system in a nonvolatile form.

Some computer systems with un-interruptable power supplies (UPS) use system state preservation techniques thereby allowing the computer system to ride through a low power condition or power outage. These state preservation techniques in UPS applications typically involve a graceful shut-down of the computer system rather than an attempt to freeze the processing state of the computer system at a particular moment in time. Thus, UPS-oriented state preservation techniques do not allow a user to continue operation of the computer system from where he/she was interrupted just prior to the loss of power.

Still other computer systems employ additional hardware or external hardware for the purpose of preserving the computer system state. Such systems reserve a portion of memory and/or dedicate a set of processor registers for the purpose of performing the state preservation function. Other system have dedicated hardware channels, interfaces, or system resources used only during the state preservation operation.

One reason why preservation of computer system state is so difficult is because any process of preserving the computer system state that uses computer system resources such as memory, processor, or a mass storage device, must use these resources without destroying the context or environment in which they were previously operating. Thus, a state preservation process must share system resources without permanently altering their state. This constraint has been particularly difficult to satisfy in small computer systems such as personal computers, laptop computers or notebook computers. Personal computer systems typically operate with a wide variety of different software application programs. These application programs often control, manipulate, or modify many if not all of the computer system resources available. It is often not possible to anticipate much less constrain the operation of application programs to a particular pre-defined resource domain. Therefore, reserving system resources for a state preservation process is often not feasible. Moreover, the low cost and competitive nature of personal computers often does not justify the addition of additional hardware dedicated to a state preservation function.

The operation of a state preservation process is made more difficult by the increased level of sophistication of hardware in modern personal computer systems. In the past, an entire computer system state could be completely defined by the content of memory and a few processor registers. Now, however, the computer system is more widely distributed throughout various resources of the system. In addition, computer system memory is now partitioned into more than one section that may not always be directly addressable by the processor. It has therefore become increasingly difficult to effectively preserve and restore the processing state in these sophisticated computer systems.

Thus, a better process and means is needed for preserving and restoring the processing state of the computer system.

SUMMARY OF THE INVENTION

The present invention is a computer system wherein the processing state of the system may be saved and restored to and from a mass storage device upon the occurrence of a triggering event.

The computer system of the present invention comprises a processor and various memory areas and system resources. These various memory areas include a main memory, a nonvolatile memory or Boot ROM, an extended memory, an expanded memory, and a battery-backed random access memory (typically implemented as a complementary metal oxide semiconductor device or CMOS device).

Main memory is the normal random access memory are used by both applications and systems software. Main memory includes several areas. One such area is a system management area comprising a segment of isolated random access memory within main memory. The system management area may only be accessed while the processor is in a system management interrupt state.

The system management interrupt state is entered upon the occurrence of a system management interrupt. The remaining portions of main memory are freely accessible (i.e. non-isolated) by any interrupt or noninterrupt processing logic.

Computer systems, such as the one used with the present invention, operate in accordance with the software and data stored in each of its memory areas, various processor registers, and various system resource or I/O device registers and state parameters. The content of this memory and these registers at any one instant in time defines the processing state of the computer system. The present invention provides a means and method for saving the processing state of a computer system in nonvolatile form and a means and method for later restoring the processing state when power returns to the computer system or the computer user resumes activity after a period of inactivity.

The basic approach of the present invention for saving the processing state of a computer system in nonvolatile storage is to: (1) sense a save system state triggering event; (2) write the contents of system registers and memory to a nonvolatile mass storage device; and (3) enter a suspend state and wait for a resume triggering event or power off the computer system completely.

The general approach of the present invention for restoring the processing state of the computer system from nonvolatile memory is to: (1) sense the resumption of processing of the application of power of the computer system; (2) read the contents of a previously saved processing state from a nonvolatile mass storage device and restore the contents of memory and computer system registers; and (3) return control to the previously running application program.

The present invention overcomes several problems present in prior art methods for saving and restoring a computer system state. First, an extended memory or another segment of memory in other computer systems, may not be accessible to the processor without switching to a different operating mode. Secondly, while in an interrupt mode, the processor cannot handle other interrupts from external devices such as the nonvolatile mass storage device. Therefore, at least a portion of the save system state operation must operate in a noninterrupt mode.

In order to overcome these problems, the processing logic of the present invention is partitioned into two main sections or modules. A first section is an interrupt handler module residing within the system management area and operating in a non-protected or normal mode. The system management area is isolated memory, thus, this first module is located within isolated memory.

The second module of the save system state processing logic of the present invention is not located within the system management area (thus, in non-isolated memory) and is not an interrupt handler routine. The second module operates in a protected mode. Using these two modules of processing logic, all areas of memory and all system resources of the computer system are accessible to at least one of the modules.

The processing logic of the present invention is initiated upon the occurrence of a triggering event. A triggering event is the occurrence of some system condition that initiates the operation of saving the system processing state to a nonvolatile mass storage device. Several conditions may produce a triggering event. For example, in a portable or laptop computer, a triggering event may be produced when the computer user closes the lid on the computer thereby activating a hardware switch. Such an act indicates the end of a computing session and the desire to save the processing state in nonvolatile mass storage. A triggering event may also occur when an inactivity timer lapses. In this case, the computer user has indicated the end of a computing session by inactivity for a predetermined period of time. Thirdly, a triggering even may be explicitly or expressly specified by the computer user through the use of a predetermined specific command sequence. Finally, a triggering event causing a save system state operation may occur if a low power or low battery condition is sensed. It will be apparent to those skilled in the art that many other system conditions may arise causing a triggering event to initiate the save system state operation.

Upon the occurrence of a triggering event, a system management interrupt is generated and processing control is transferred to a general interrupt service routine and thereafter to the first processing module of the present invention. The first processing module is an interrupt handler module residing within the system management area and operating in a non-protected or normal mode. The first processing module reads status, size, and location information from a battery-backed random access memory. The status, size, and location information defines an area in the nonvolatile mass storage device pre-allocated for storage of system state information. Next, the device registers and state parameters associated with the nonvolatile mass storage device, and device registers and state parameters of other devices or the system resources needed for the save system state operation, must be read and saved. The device registers and state parameters of the mass storage device are stored in a portion of the system management area. Once the state of each of the system resources required to save the system state has been written to the system management area, a work space in main memory must be provided for the operation of the save system state processing logic. The contents of a random access memory (RAM) area workspace are read from main memory and stored in the system management area. The RAM area workspace in main memory may thereafter be cleared and made available to the save system state processing logic for use as a stack or parameter block or for any other purpose.

At this point in the save system state operation, the contents of the RAM area workspace and the device registers and state parameters of the nonvolatile mass storage device (and the state of other required system resources) have been saved in the system management area. It is now desirable to begin writing memory blocks to nonvolatile mass storage device using the RAM area workspace as a stack or a parameter block area; however, the first module of the present invention will be unable to perform this operation for two reasons. First, because the first module is an interrupt handler, this module will be unable to receive interrupts from the nonvolatile mass storage device. Secondly, the first module will be unable to access extended memory, because the first module does not operate in a protected mode. For these reasons, the first module must transfer processing control to the second module.

The second module is a non-interrupt protected-mode processing module. In order to transfer control to the second module, the processor state is modified. Prior to modification, however, the current processor state is saved in a region of the system management area. This processor state just saved in the system management area corresponds to the return from interrupt address of the application program executing when the save system state triggering even was activated. Now that the processor state in the system management area has been saved, a processor state corresponding to a transfer of processing control to the second module can be written to the processor state portion of the system management area. A RETURN_FROM_INTERRUPT instruction can now be executed by the first module which causes a transfer of processing control to the second module. Once this transfer occurs, processing continues with the second module in a non-interrupt protected processing mode.

The second module reads the status, size, and location of a pre-allocated mass storage save area from the battery-backed random access memory and writes the contents of main memory, extended memory, expanded memory, and a video memory image to the mass storage save area. The device registers and state parameters of non-essential I/O devices are also written to the mass storage save area. The battery-backed random access memory image is also retrieved and written to the mass storage save area on the mass storage device.

At this point, all of the memory areas of the computer system have been written to mass storage device with the exception of the system management area. The system management area will not have been transferred to the nonvolatile mass storage device, because the second processing module does not have access to the system management area. Therefore, the second module generates a system management interrupt (SMI), which reactivates the interrupt logic of the first processing module. The first processing module writes the entire content of the system management area into an area of main memory that is not within the system management area itself. Once the system management area is copied to an area of main memory, a return from interrupt instruction is executed and control is returned to the second processing module. The non-interrupt and protected mode logic of the second module is thus reactivated.

Once control is returned to the second module, the system management area image block is written to the nonvolatile mass storage device. The successful completion of the save system state operation is indicated in a status area in the battery-backed random access memory and recorded in the header portion of the system state image recorded on the nonvolatile mass storage device.

Having completely saved the computer system state on the nonvolatile mass storage device, the save system state operation continues with the generation of another system management interrupt to cause the computer system to enter a low power mode. Execution control will remain suspended in a low power mode for a predetermined length of time. This period of time enables the computer user to resume operation of the computer system from low power mode. If, however the user does not resume operations after the predetermined length of time has expired, another system management interrupt is generated to power off the system completely. Thus, the save system state operation of the preferred embodiment of the present invention is completed.

The present invention includes a means and method for performing a restore system state operation. In the preferred embodiment, the processing state of the computer system of the preferred embodiment may be restored from an image previously saved on a nonvolatile mass storage device in one of two ways. First the computer system may be powered up or a hardware reset of the system may be initiated. Secondly, for a computer system still powered up, but currently in a low power or suspended state, a resume operation event may be initiated in one of two ways. The first way to resume operation is the activation of a resume button. Such a resume button, for example, may be activated upon opening the lid of a laptop or portable personal computer. Another way of resuming operation is an activation of any key on a keyboard coupled to the computer system or the activation of a mouse device coupled to the computer system. An activation of an input device coupled to the computer system in this way indicated the resumption of activity by a computer user after a period in activity.

For a restore system state operation initiated upon a reset or power up even or a resume event, processing control is transferred to the general interrupt service processing logic and thereafter to a first restore module.

The first action perform is to check the battery-backed random access memory to determine if the content of battery-backed random access memory is valid. If the battery-backed random access memory is valid, the status, size and location of the mass storage save area stored in a portion of the battery-backed random access memory is read from the battery-backed random access memory. If the status information read from the battery-backed random access memory indicates that a save image exists on the nonvolatile mass storage device, the header of the system state save area on the mass storage device is read. If the system state image on the mass storage device is valid, as determined by checking a checksum retrieved from the header, a data item is set to indicate the activation of a restore system state operation. Next, a protected mode processor state image is transferred to the processor state area in the system management area and a return from interrupt instruction is executed. The return form interrupt instruction results in a transfer of processing control to a second restore module. The second restore module is a noninterrupt protected mode processing module residing in non-isolated memory.

Upon activation, the second module determines if the current operation is a restore system state operation or a resume operation. If the restore system state operation is active, the second module reads the header from the saved system state image previously saved on nonvolatile mass storage device. If the saved image is compatible with the current computer system configuration, the system management save image are is retrieved from the mass storage device and written to an area of main memory which is accessible to the first restore system state module. As described earlier in the description of the save system state operation, the system management area (i.e. isolated memory) cannot be directly restored by the second restore module; because, the second restore module is not an interrupt processing module, for this reason, a system management interrupt (SMI) must be generated to transfer control to the first restore module. Upon generation of the system management interrupt (SMI), processing control is transferred to the first restore module. The first module is an interrupt handler module operating in a non-protected mode. Upon activation, the system management save area image previously written to an accessible area of main memory is retrieved and written to the system management area. Processing for the first restore module is terminated with a return from interrupt. Once the return from interrupt instruction is executed, control returns to the second restore module.

Having reactivated the second processing module, the battery-backed random access memory image is read from the mass storage device and written to the battery-backed random access memory. Next, the device registers and state parameters of I/O devices and system resources not required by the restore system state operation are restored from the mass storage device. Having restored the state of the other I/O devices and system resources, the remainder of the memory block images stored on the nonvolatile mass storage device are retrieved and written to their corresponding locations in computer system memory. Specifically, main memory, extended memory, expanded memory, and video memory are restored from the saved image on the mass storage device. Finally, the header of the save area on the nonvolatile mass storage device is marked to indicate that the saved image is now invalid.

Having restored the memory areas described above, it now becomes necessary to restore the state of the nonvolatile mass storage device and the contents of the random access memory workspace area. These areas must be restored using an interrupt and non-protected mode processing module. In order to activate such a module, another system management interrupt (SMI) is used to reactivate the interrupt logic of the first restore module. The first restore module resides in isolated memory. Upon reactivation of the first restore module, the random access memory (RAM) area workspace is restored from the system management saved RAM area. Similarly, the device registers and state parameters of the nonvolatile mass storage device are restored from the saved mass storage device state in the system management area. Finally, the processor state of the system management area is restored from the saved processor state. The saved processor state represents the processor state of the application of other program executing when a save system state trigger event occurred thereby causing the computer system state to be saved on the nonvolatile mass storage device.

Having completed the restoration of the entire computer system state a return from interrupt instruction is now executed. Upon execution of the return from interrupt instruction, the processor state is accessed to transfer control back to the application or other program operating upon the occurrence of a save system state triggering event, thus completing the restore system state operation.

The present invention also performs a resume operation. A resume operation is performed upon the occurrence of a resume event such as the activation of a resume button (i.e., the opening of the lid of a laptop computer), the activation of any key on the keyboard attached to the computer system, of the activation of any other input device coupled to the computer system. The resume operation is performed to reactivate a computer system previously suspended or placed in a low power mode. Because operation of the computer system is being resumed from a low power mode or a previously suspended state, most of the contents of memory and the state of I/O devices and system resources is still valid. A suspended state or low power mode protects system memory and registers from destruction. Thus, in this case, it is not necessary to restore the complete contents of memory of registers from the previously saved system state image on the nonvolatile mass storage device. For this reason, the system state image saved on the mass storage device is no longer needed. In this case, a data item in random access memory (RAM) workspace is set to indicate the activation of a resume mode. Once the RAM workspace area is marked for a resume operation, a protected mode processor state image is transferred to the processor state area of the system management area and a return from interrupt instruction is executed. This action results in a transfer of processing control to a module denoted second resume module. The second resume module is a noninterrupt protected mode processing module. Upon activation, the second module determines if the current operation is a restore system state operation or a resume operation. In this case, the resume operation is active, because a data item in the RAM workspace area was previously set to indicate a resume operation. The header of the save area on the nonvolatile mass storage device is marked to indicate that the saved image is now invalid. It now becomes necessary to restore the state of the nonvolatile mass storage device and the contents of the random access memory workspace area. These areas must be restored using an interrupt and non-protected mode processing logic in a first resume module. In order to activate such a module, another system management interrupt (SMI) is used to reactivate the first module. Upon activation, the first resume module restores the saved random access memory (RAM) area workspace from the system management saved RAM area. Similarly, the device registers and state parameters of the nonvolatile mass storage device are restored from the saved mass storage device state in the system management area. Finally, the processor state of the system management area is restored from the saved processor state also within the system management area. The saved processor state represents the processor state of the application or other program executing when a save system state trigger event occurred thereby causing the computer system state to be saved on the nonvolatile mass storage device.

Having completed the resume operation, a return from interrupt instruction is now executed to transfer control back to the application or other program operating upon the occurrence of a save system state triggering event, thus completing the resume system state operation.

It is therefore an object of the present invention to provide a process for preserving the state of a computer system upon the occurrence of a triggering event. It is a further object of the present invention to provide a process for preserving system state on a mass storage device. It is a further object of the present invention to provide a state preservation process that operates despite the presence of both isolated memory and non-isolated memory. It is a further object of the present invention to provide a state preservation process that saves the state of all computer system memory including main memory, extended memory, and expanded memory. It is a further object of the present invention to provide a state preservation process that does not constrain software application programs to a particular operating environment. It is a further object of the present invention to provide a state preservation process that shares system resources used during normal operation of the computer system. It is a further object of the present invention to provide a state preservation process as a means to extend the battery life of a battery-powered computer system instead of only to preserve the state of the application when power fails. It is a further object of the present invention to provide a state preservation process whereby the user is able to continue or resume using the application that was being used when the system state preservation process was first initiated.

These and other objects of the present invention will become apparent as presented and described in the following detailed description of the preferred embodiment.

DETAILED DESCRIPTION OF THE PREFERRED EMBODIMENT

The present invention is a computer system wherein the processing state is preserved on a mass storage device on the occurrence of a triggering event. In the following description, numerous specific details are set forth in order to provide a thorough understanding of the invention. However, it will be apparent to one of ordinary skilled in the art that these specific details need not be used to practice the present invention. In other instances, well known structures, circuits, and interfaces have not been shown in detail in order not to unnecessarily obscure the present invention.

Figure 1:
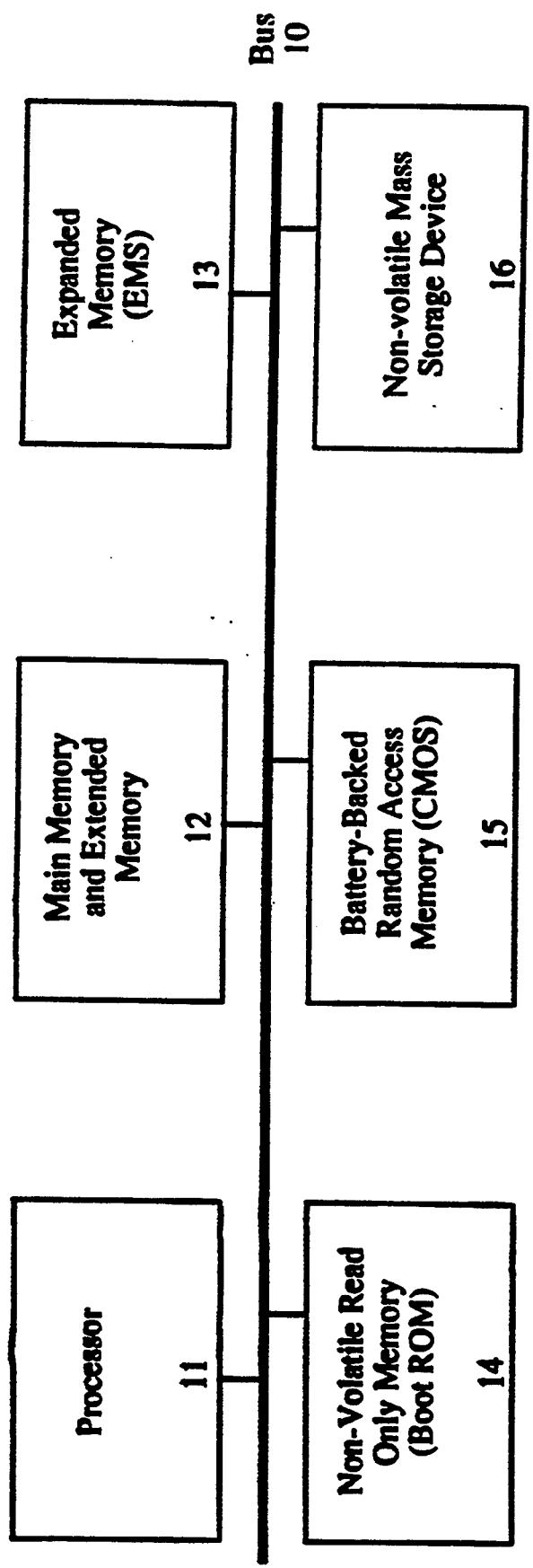
FIG. 1 is an illustration of a typical architecture of the computer system of the present invention.

Referring to FIG. 1, a block diagram of the architecture of the computer system of the present invention is illustrated. In general, such computer systems comprise a bus 10 for communicating information, a processor 11 coupled with the bus for processing information, a main memory and extended memory component 12 coupled to the bus 10 for storing information and instructions for the processor 11 in a random access memory (RAM) form, an expanded memory (EMS) component 13 coupled to the bus 10 for increasing the available size of random access memory which is used for storing information and instructions, a nonvolatile read only memory (Boot ROM) component 14 coupled with the bus 10 for storing low-level processor instruction and device driver processing logic in a nonvolatile form, a battery-backed random access memory (typically implemented as a complementary metal oxide semiconductor device or CMOS device) component 15 coupled to the bus 10 for storing configuration information and computer system specific data, and a nonvolatile mass storage device 16 coupled to the bus 10 providing a large direct access data storage medium such as that typically available with a hard disk device. It will be apparent to those skilled in the art that the computer system architecture illustrated in FIG. 1 may also include a display device, an input device, or other system resources (not shown).

One example of a computer system architecture similar to that shown in FIG. 1 is the IBM PC ™ brand personal computer available from IBM Corporation of Armonk, N.Y. The processor 11 used in the preferred embodiment of the present invention is an 80386SL ™ brand microprocessor manufactured by the assignee of the present invention. It will be apparent to those skilled in the art that other computer system architectures, such as those architectures without a system bus, may benefit from the features of the present invention.

Figure 2:
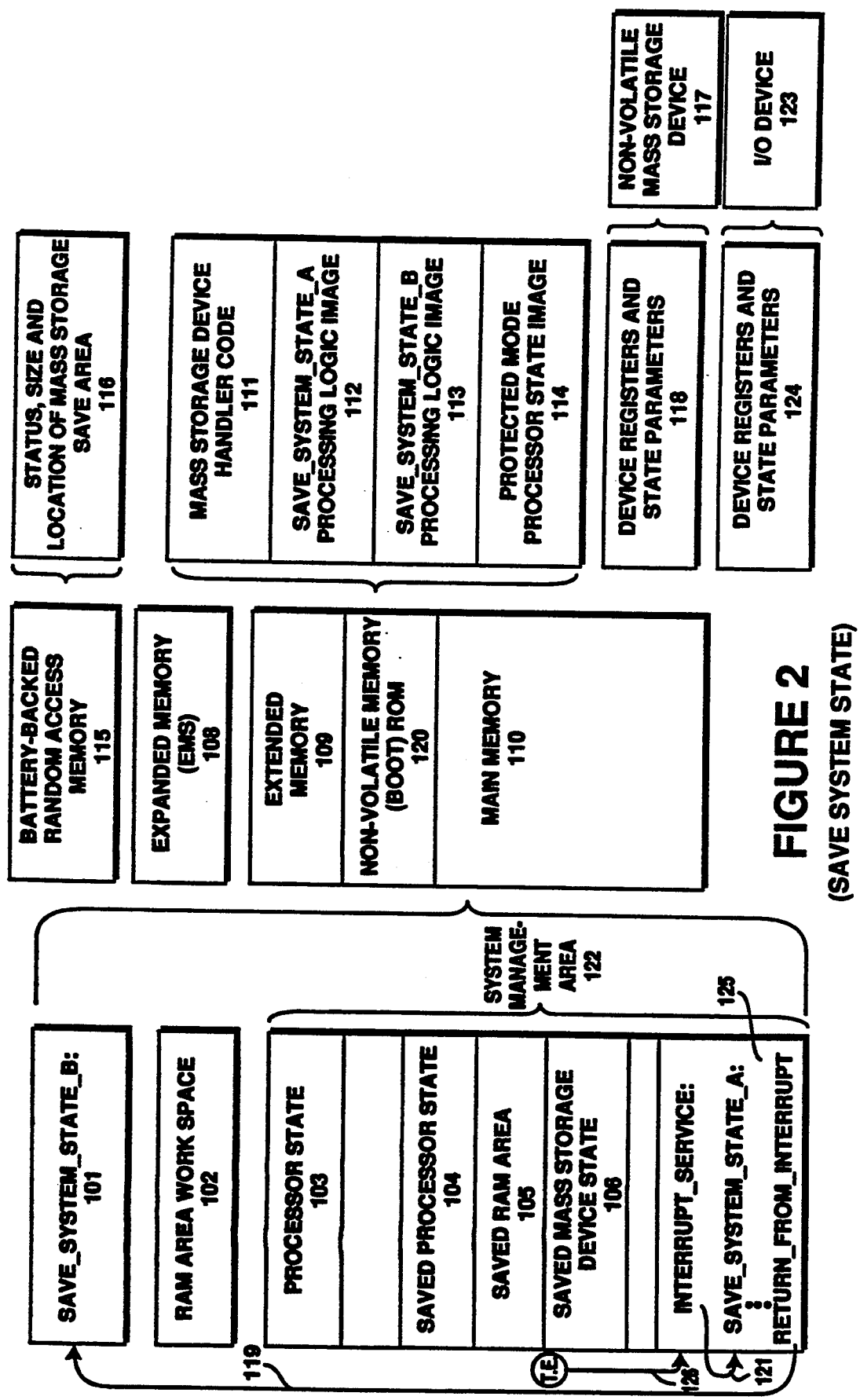
FIGS. 2 and 3 illustrate the memory areas and system resources manipulated by the present invention during a save system state operation.

Referring now to FIG. 2, the various memory areas available in the computer system of the present invention are illustrated. These various memory areas include main memory 110, nonvolatile memory (Boot ROM) 120, extended memory 109, expanded memory 108, and battery-backed random access memory 115. Main memory 110 is the normal random access memory area used by both applications and system software. In the preferred embodiment, main memory 110 occupies the least significant or lower one Megabyte of the available address space. Nonvolatile memory 120 is a read only memory (Boot ROM) device used for storage of low level system software, device drivers, and permanent configuration data. Nonvolatile memory (Boot ROM) 120 typically includes a basic input-output system (BIOS) comprising processing logic which is used to control the low level resources of the computer system. The use of a Boot ROM such as nonvolatile memory 120 is well known in the art. Extended memory 109 is an area of additional random access memory occupying a more significant or upper region of the memory address space. Expanded memory 108 is an expanded memory system (EMS) typically implemented as a plug-in memory board that becomes accessible to the computer system through the use of input-output calls. Battery-backed random access memory 115, typically implemented as CMOS memory, is provided for the retention of configuration data that is saved as long as battery power is available. When a battery powering the battery-backed random access memory 115 fails, the contents of the battery-backed random access memory 115 is lost. Finally, nonvolatile mass storage device 117 is provided for large volume permanent storage of data. Typically, nonvolatile mass storage device 117 is a hard disk drive or equivalent magnetic storage medium. Nonvolatile mass storage device 117 can also be implemented as a device other than a hard disk drive such as flash memory. Flash memory is well known to those of ordinary skill in the art. It will be apparent to those skilled in the art, however, that mass storage device 117 may be implemented using a variety of mass storage direct access data storage technologies.

Referring still to FIG. 2, main memory 110 includes several areas. One such area is system management area 112. System management area 112 is a segment of isolated random access memory within main memory 110. System management area 122 may only be accessed while processor 11 is in a system management interrupt state. The system management interrupt state is entered upon the occurrence of a system management interrupt. The use of a system management area and a system management interrupt are well known in the art. The remaining portions of main memory 110, such as area 101 and area 102, are freely accessible (i.e. non-isolated) by any interrupt or noninterrupt processing logic.

Computer systems, such as the one illustrated in FIGS. 1 and 2, operate in accordance with the software and data stored in each of the memory areas (i.e., memory areas 115, 108, 109, 120 and 110), various processor registers (not shown), and various system resource or I/O device registers and state parameters (for example, device registers and state parameters 118 and 124). The content of this memory and these registers at any one instant in time defines the processing state of the computer system. As long as the computer system remains powered, the processing state retains continuity. Once power is lost, however, the contents of processor registers, device registers, and random access memory is lost. Along with the loss of registers and memory, the processing state of the computer system is also lost. It would greatly increase the utility of computer system if the processing state of the computer could be saved in nonvolatile form and restored at some later time when power to the computer system returns. Such a capability for saving the processing state in nonvolatile form is particularly useful for portable computers. Portable computers typically operate on batteries capable of sustaining computer operation for a most several hours. Moreover, the operation of a portable computer is typically interrupted frequently as the portable computer is moved from location to location. Current portable computer system typically take two general approaches to handling the loss of power. First, some portable computer systems allow application software to remain active in a low power mode with the risk of losing the application if power is completely exhausted. This approach does not save the processing state of the computer, but rather allows the computer to operate in a reduced power mode until power is finally lost.

The second approach involves sensing when a low power or low battery condition is present. Upon sensing a low power condition, the user is prompted to explicitly shut down applications software and power down the system. When power is restored to the computer system, the user must restart or reboot the computer system and reactivate the applications in which he was previously operating. The requirement of shutting down and restarting the applications serves to interrupt the continuous utility of the computer system. Thus these two prior art approaches limit the easy and reliable use of computer systems and especially portable computers.

The present invention provides a means and method for saving the processing state of a computer system in nonvolatile form with a means for restoring the processing state of the computer system for nonvolatile storage. The basic approach of the present invention for saving the processing state of a computer system in nonvolatile storage is to: (1) sense a save system state triggering event; (2) write the contents of system registers and memory to nonvolatile mass storage device 117 illustrated in FIG. 2; and (3) enter a suspend state and wait for a resume triggering event or power off the computer system completely.

The general approach of the present invention for restoring the processing state of the computer system from nonvolatile memory is to: (1) sense the resumption of processing or the application of power to the computer system; (2) read the contents of a previously saved processing state from nonvolatile mass storage device 117 and restore the contents of memory and computer system registers; and (3) return control to the previously running application program.

Several problems had to be overcome in order to implement the approach used by the present invention. First, extended memory 109 or another segment of memory in other computer systems, may not be accessible to the processor 11 without switching to a different operating mode. Specifically, the processor 11 used in the present invention includes at least two operating modes. The first operating mode (i.e. normal mode) is used which accessing main memory 110, nonvolatile memory Boot ROM 120, expanded memory 108, and battery-backed random access memory 115. A second processor 11 mode called protected mode must be enabled prior to access of extended memory 109. The use of a normal mode and a protected mode in a processor is well known in the art.

Another problem complicating the operation of saving a processing state to nonvolatile mass storage is using an interrupt driven mass storage device without losing control of the save system operation. The triggering event that initiates the save system state operation is an interrupt that places the processor 11 in an interrupt mode. While in interrupt mode, however, the processor cannot handle other interrupts from external devices such as the nonvolatile mass storage device 117. Therefore, at least a portion of the save system state operation must operate in a noninterrupt mode. In an alternative embodiment, the use of interrupts for accessing nonvolatile mass storage device 117 may be avoided by use of a polled device handler. An approach using a polled device handler, however would operate somewhat more slowly. Thus these problems render the save system state operation much more complicated than simply writing a memory image to a mass storage device. It will be apparent in the following description of the invention how the present invention overcomes these problems.

Referring again to FIG. 2, the configuration of data and processing instructions within the memory and system resources of the computer system during a save system state operation is illustrated. The processing logic of the present invention is partitioned into two main sections or modules. A first section is denoted SAVE_SYSTEM_STATE_A and is illustrated in FIG. 2 in memory block 125. The SAVE_SYSTEM_STATE_A module is an interrupt handle routine within system management area 122 operating in a non-protected or normal mode. System management 122 is isolated memory, thus, the SAVE_SYSTEM_STATE_A module is located within isolated memory.

The second module of the save system state processing logic of the present invention is denoted SAVE_SYSTEM_STATE_B and is depicted in memory block 101 illustrated in FIG. 2. The SAVE_SYSTEM_STATE_B module is not located within the system management area 122 (thus, in non-isolated memory) and is not an interrupt handler routine. The SAVE_SYSTEM_STATE_B module operates in a protected mode.

Figure 3:
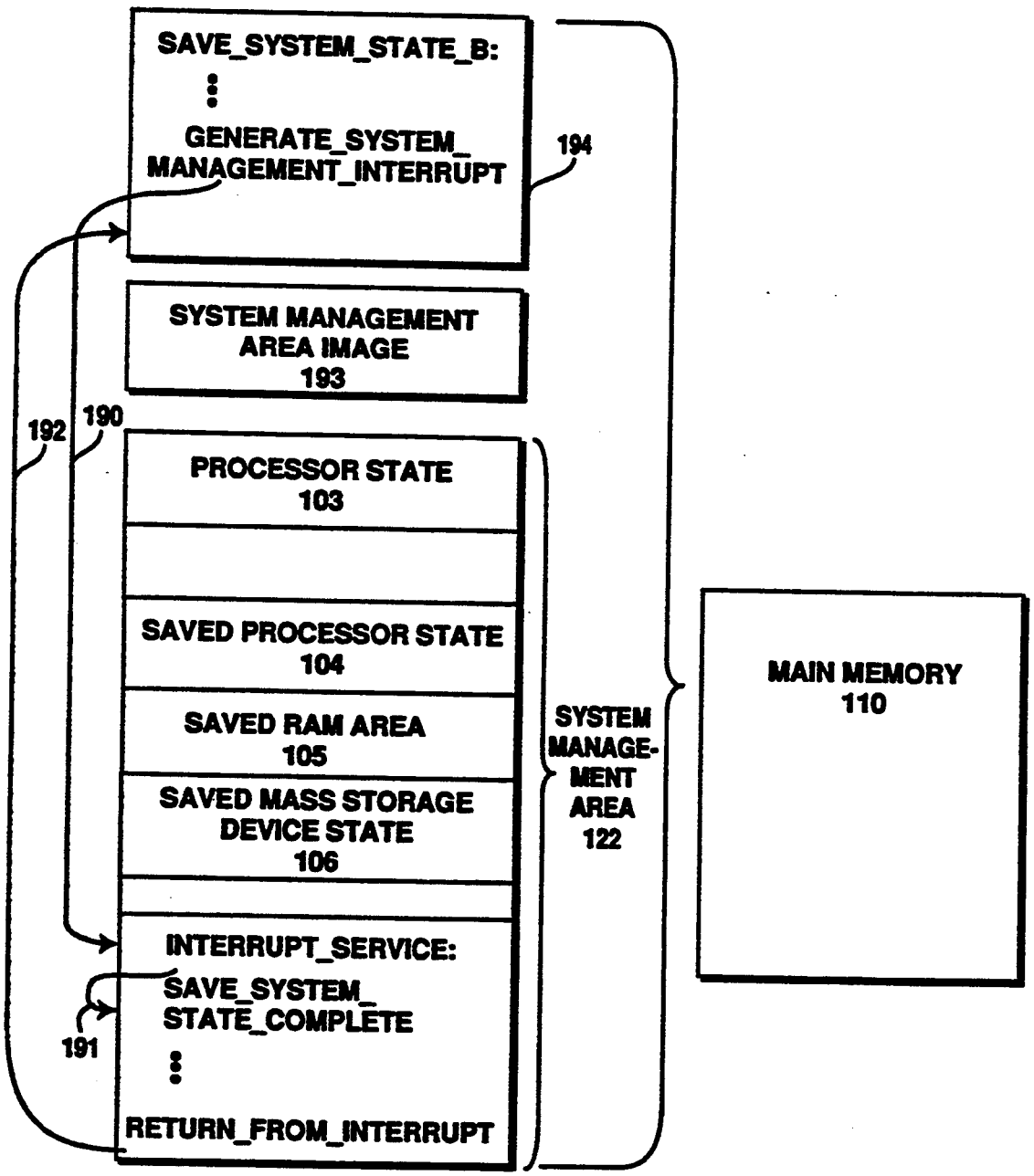
Figure 4:
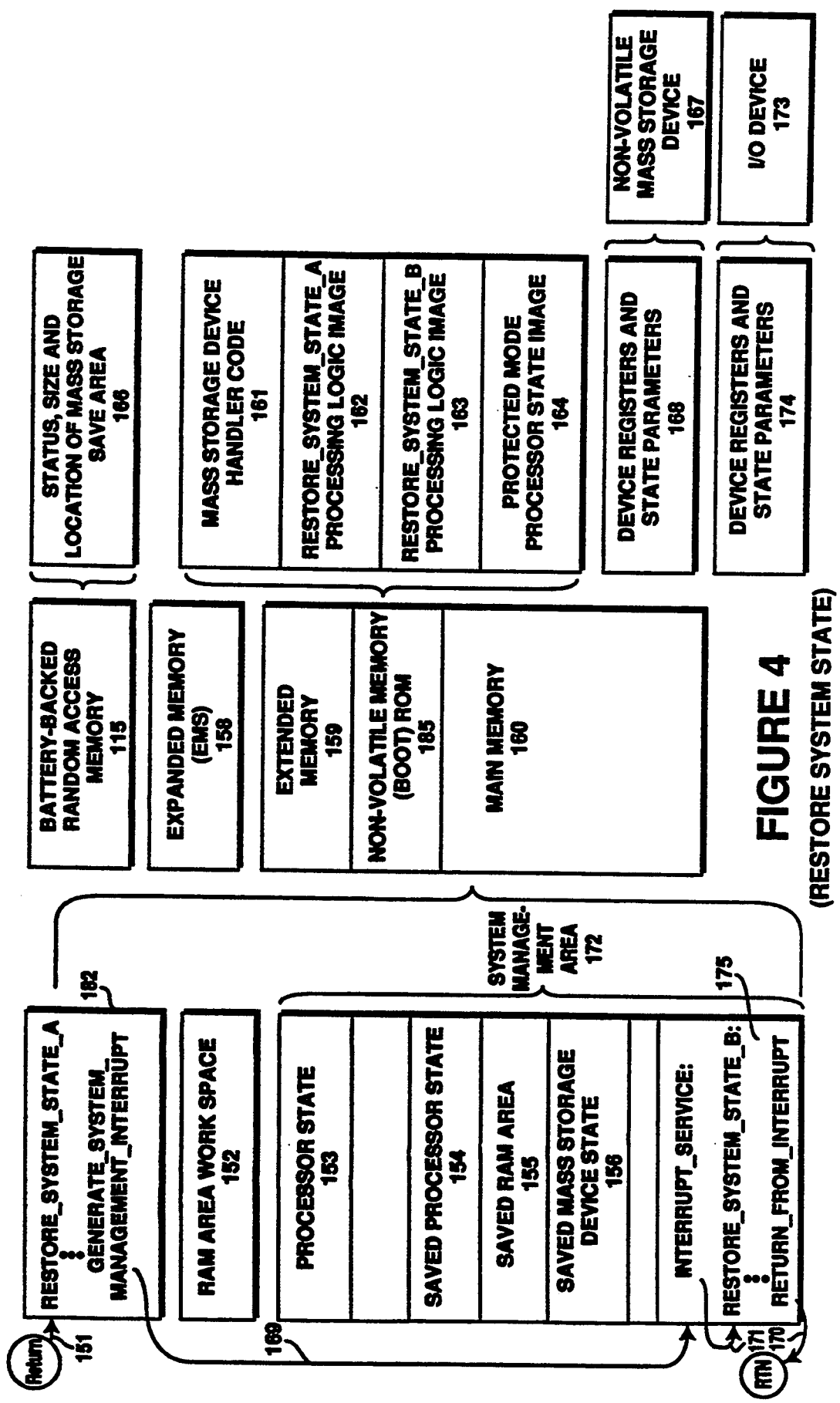
FIG. 4 illustrates the memory areas and system resources manipulated by the present invention during a restore system state operation.

The actual processing logic comprising both modules of the save system state processing logic may be stored in nonvolatile memory 120 and transferred to main memory 110 during the bootstrap initialization process. Thus, as illustrated in FIG. 2, the SAVE_SYSTEM_STATE_A processing logic image 112 may be stored in the Boot ROM 120. Similarly, the code image 113 for the SAVE_SYSTEM_STATE_B module may also be stored in Boot ROM 120. System resource or device handlers may also be stored in Boot ROM 120 as part of the basic input-output operating system (BIOS). One such handler is mass storage device handler 111 which contains processing logic for controlling nonvolatile mass storage device 117. In the preferred embodiment, mass storage device handler 111 is an interrupt driven device handler. The remaining elements illustrated in FIG. 2 are discussed in relation to the save system state functional flow as illustrated in the flowcharts of FIG. 5 through FIG. 11. FIGS. 3 and 4 are discussed below in relation to the functional flow of the present invention.

OPERATION OF THE PREFERRED EMBODIMENT

Referring now to FIGS. 5–20, the operation of the processing logic of the present invention is illustrated. The processing logic of the present invention is initiated upon the occurrence of a triggering event. A triggering event is the occurrence of some system condition that initiates the operation of saving the system processing state to nonvolatile mass storage device 117. Several conditions may produce a triggering event. For example, in a portable or laptop computer, a triggering event may be produced when the computer user closes the lid on the computer thereby activating a hardware switch. Such as act indicates the end of a computing session and the desire to save the processing state in nonvolatile mass storage. A triggering even may also occur when an inactivity timer lapses. In this case, the computer user has indicated the end of a computer session by inactivity for a predetermined period of time. Thirdly, a triggering event may be explicitly or expressly specified by the computer user through the use of a predetermined specific command sequence. Finally, a triggering even causing a save system state operation may occur if a low power or low batter condition is sensed. It will be apparent to those skilled in the art that may other system conditions may arise causing a triggering event to initiate the save system state operation.

Figure 5:
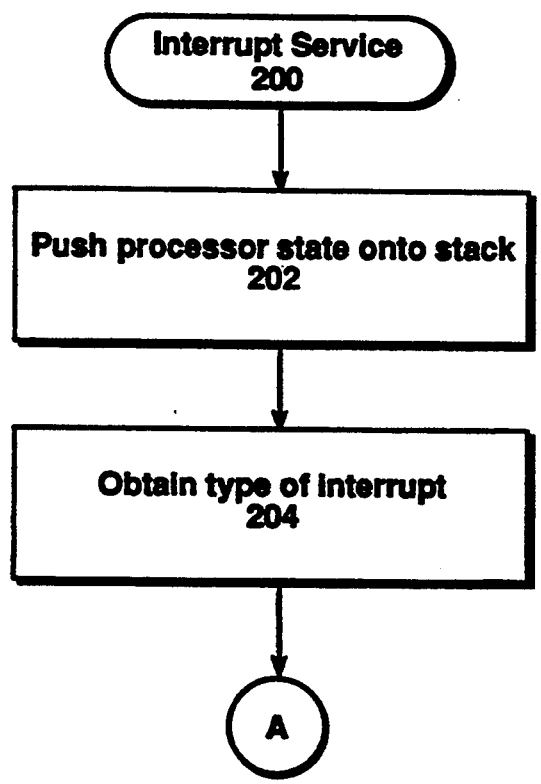
FIGS. 5-20 are flow charts illustrating the processing logic of the present invention.

Upon the occurrence of a triggering event, a system management interrupt is generated and processing control is transferred to the bubble labeled "Interrupt Service" 200 illustrated in FIG. 5. The occurrence of a triggering event is also indicated in FIG. 2 by arrow 126. The interrupt service entry point 200 is a general purpose interrupt service routine for system management interrupts. Following interrupt transfer to interrupt service bubble 200, the processor state is pushed onto a stack (processing block 202) in main memory 110. The processor state includes the contents of registers, pointers, and other parameters associated with the operation of the processor. These processor state parameters are stored in an area 103 (a stack) of system management area 122. As illustrated in FIG. 5, once the processor state is saved on the stack, the type of system management interrupt that occurred is retrieved in processing block 204 and processing control continues at the bubble labeled A illustrated in FIG. 6.

Figure 6:
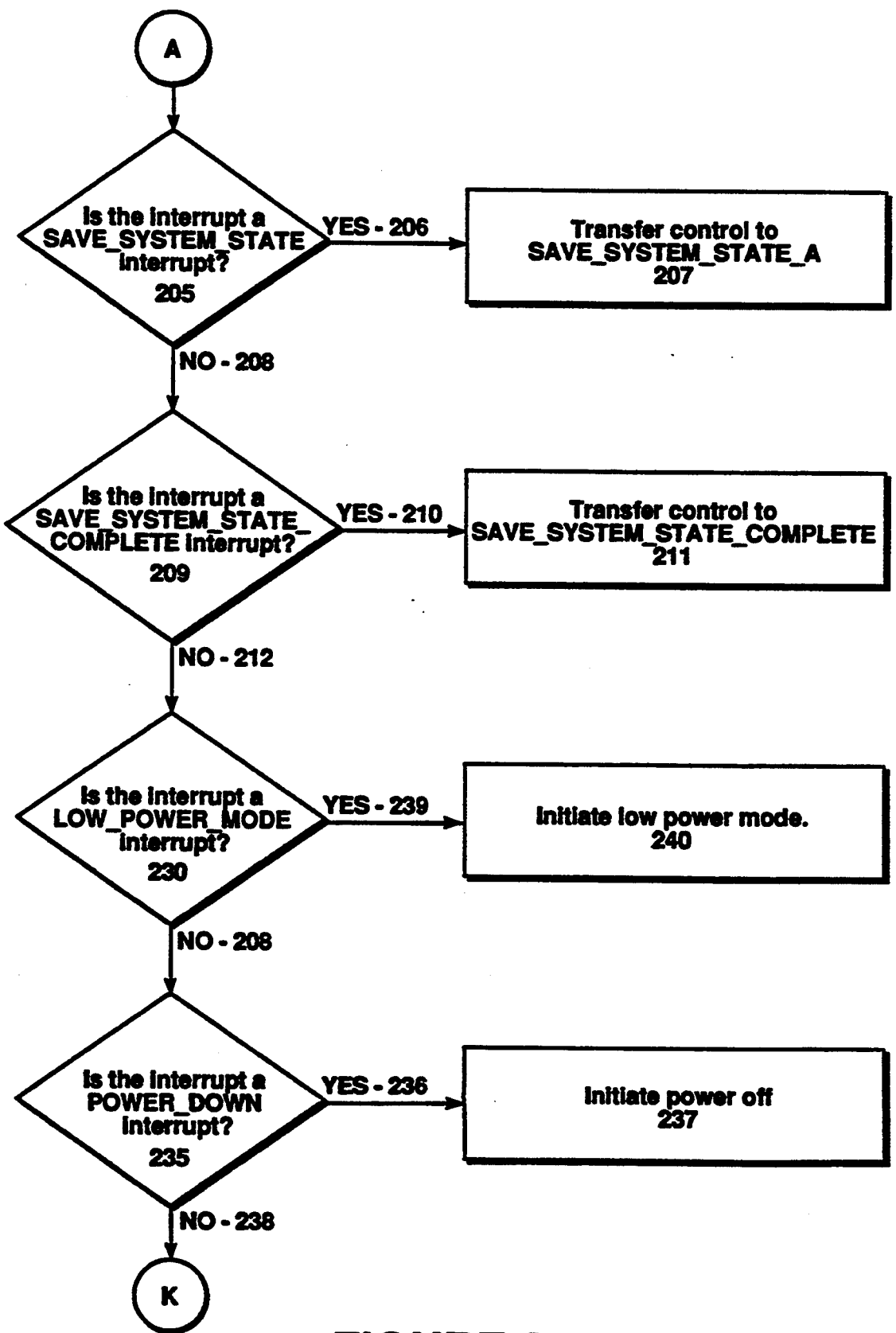

Referring now to FIG. 6, a decision block 205 is executed to determine if the interrupt that occurred is a save system state interrupt. If not, processing path 208 is taken to decision block 209 where additional conditions are tested. These conditions will be tested and described in later sections of the description of the invention herein. If the interrupt that occurred was a save system interrupt, processing path 206 is taken to processing block 207 where processing control is transferred to the first module of the processing logic of the present invention (i.e., SAVE_SYSTEM_STATE_A). The entry point for the SAVE_SYSTEM_STATE_A processing logic is illustrated in bubble 300 of FIG. 9.

Figure 9:
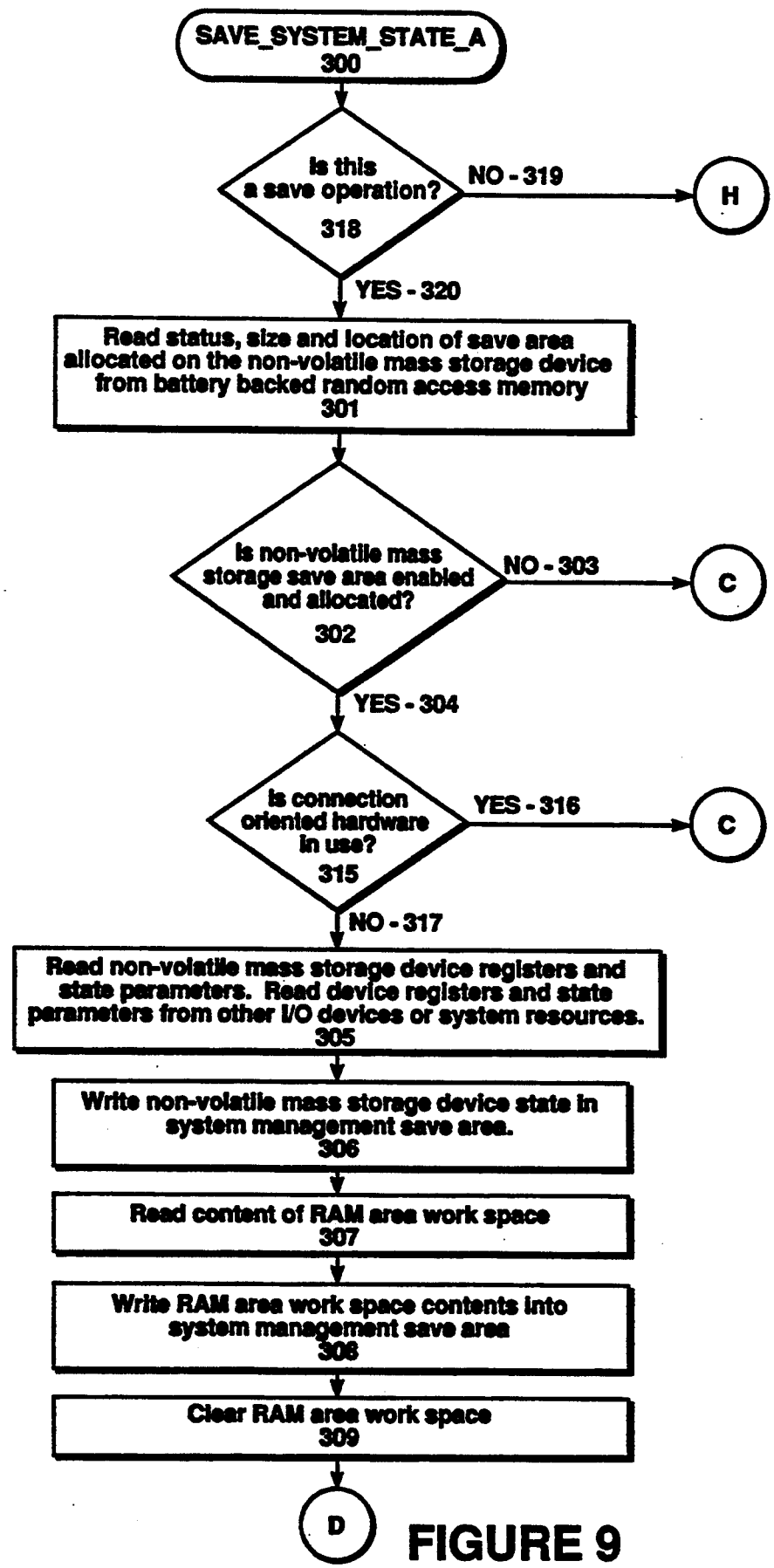
Figure 15:
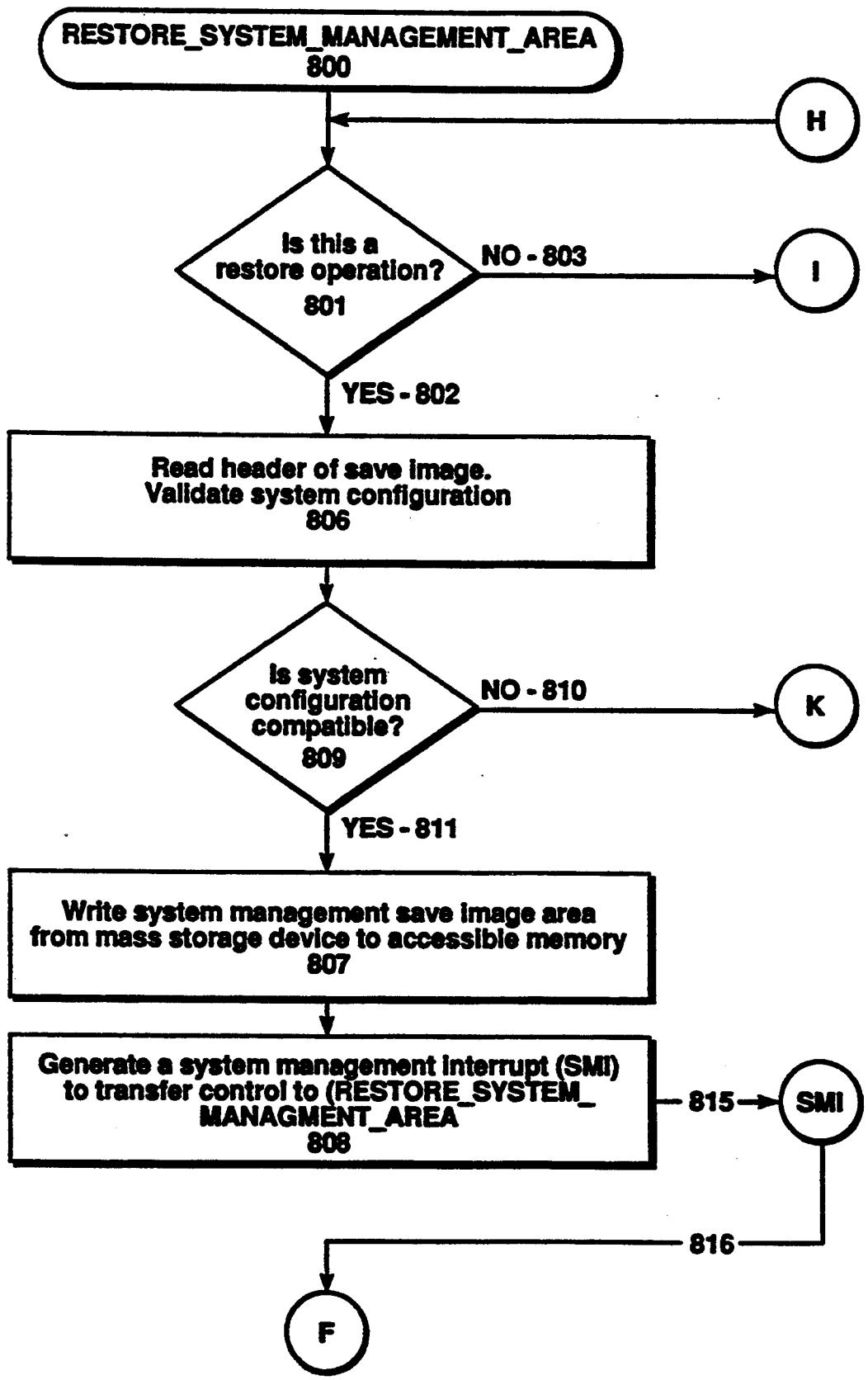

Referring now to FIG. 9, the SAVE_SYSTEM_STATE_A processing logic of the present invention is illustrated. The processing logic starting at bubble 300 in FIG. 9 is executed upon the occurrence of a save system state interrupt as depicted by arrow 121 illustrated in FIG. 2. Referring again to FIG. 9, the first action performed by the SAVE_SYSTEM_STATE_A processing logic is to determine if the current operation is a save system state operation or a restore system state operation (decision block 318). In some implementations of the present invention, the same entry point may be used for the save operation, the restore operation, or the resume operation. An operation type parameter may be stored in random access memory and used to specify the type of operation currently active. If the restore system state operation is active, processing path 319 is taken to the bubble labeled H as illustrated in FIG. 15. If the save system state operation is active, processing path 320 is taken to processing block 301 wherein the SAVE_SYSTEM_STATE_A processing logic reads status, size, and location information from battery-backed random access memory 115. The status, size, and location information is indicated in block 116 illustrated in FIG. 2. The status, size, and location information defines an area in nonvolatile mass storage device 117 pre-allocated for storage of system state information. The status, size, and location information may be stored in battery backed random access memory 115 at memory configuration time.

Figure 8:
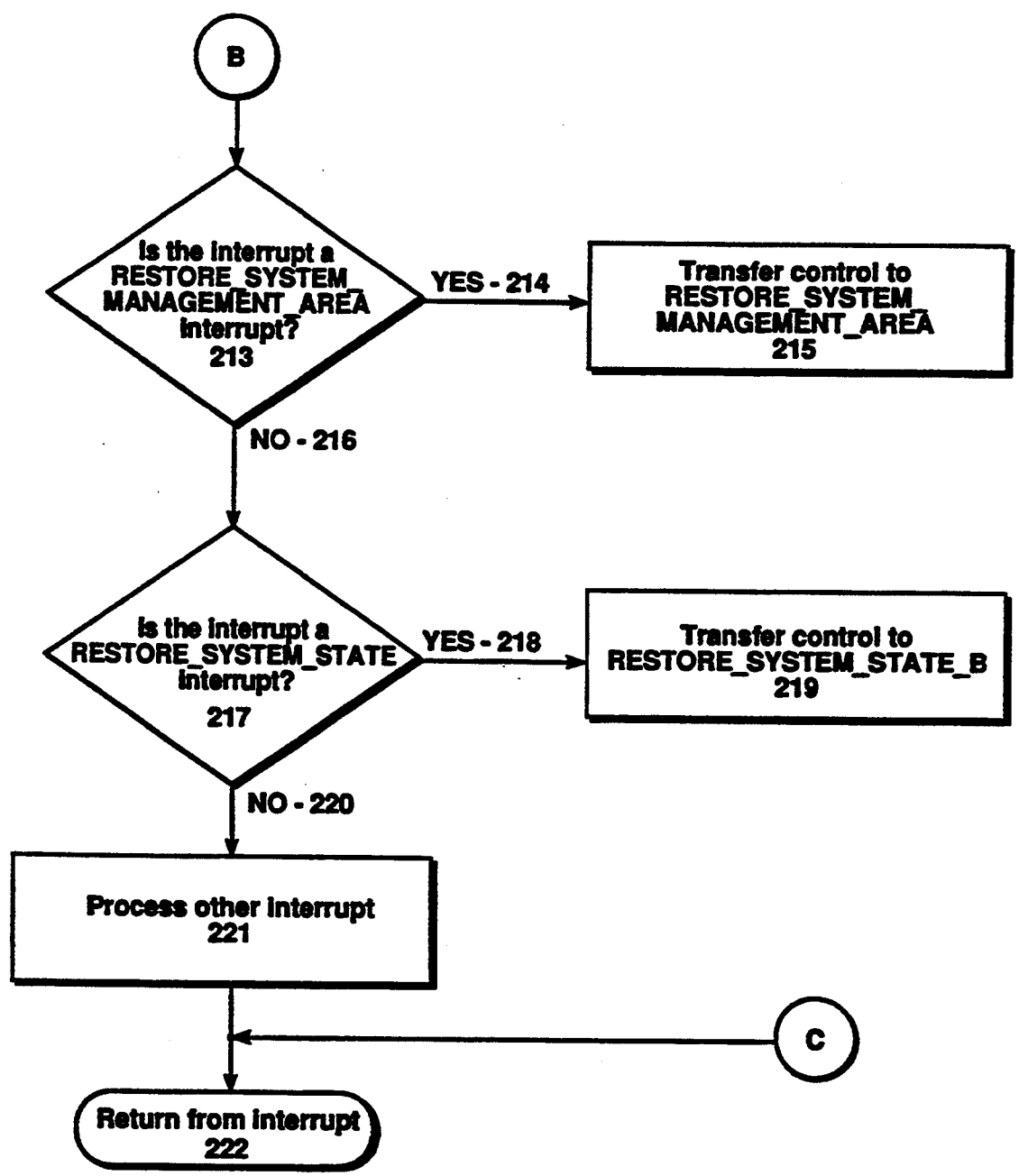

Referring again to FIG. 9, if an area of nonvolatile mass storage device 117 has not been allocated (decision block 302) as indicated by information stored in battery-backed random access memory 115, processing path 303 is taken to the bubble labeled C illustrated in FIG. 8. In this case, because no storage area has been allocated on the mass storage device, no further processing for the save system state operation occurs. Therefore, a return from interrupt instruction 222 is executed to return control from the interrupt caused by a triggering event.

Referring again to FIG. 9, if a nonvolatile mass storage save area has been allocated, processing path 304 is taken to decision block 315. In decision block 315, connection oriented computer system hardware is checked for activity occurring at the time the triggering event occurred. Connection oriented hardware includes modems, network links, or other form of data links that render the save system state operation ineffective or of limited use. When connection oriented hardware is in use at the time of a save system state triggering event, the system state may be stored on nonvolatile mass storage; however, the system state may not be able to be reliably restored. Reliable restoration with connection oriented hardware is difficult because it may not be possible to save and restore the state of the connected device. If this is the case, processing path 316 is taken to the bubble labeled C illustrated in FIG. 8 where the return from interrupt instruction 222 is executed thereby terminating the save system state operation.

Referring again to FIG. 9, if no connection oriented hardware is in use, processing path 317 is taken to processing block 305. At processing block 305, the device registers and state parameters associated with nonvolatile mass storage device 117 are read. These device registers and state parameters are indicated on FIG. 2 by block 118. Nonvolatile mass storage device 117 is a shared device. This device may have been in use during or just prior to the save system state triggering event. In order to provide reliable system restoration, therefore, the device registers and state parameters of the nonvolatile mass storage device 117 must be saved in order to effectively restore the state of the nonvolatile mass storage device 117 to its condition existing upon the occurrence to the save system state triggering event. In a similar manner, the device registers and state parameters of other devices or other system resources needed for the save system state operation must be read and saved. The device registers and state parameters 118 of mass storage device 117 are stored in a portion 106 of system management area 122. Memory area 106 serves as the saved mass storage device state and the saved state of other necessary devices or system resources.

Referring again to FIG. 9, once the state of each of the system resources required to save the system state has been written to system management area 122 (processing block 306), a work space 102 in main memory 110 must be provided for the operation of the save system state processing logic. Because any portion of computer system memory may contain valid code or data, no portion of memory may be destroyed by the operation of the save system state processing logic. For this reason, RAM area workspace 102 of main memory 110 must be saved in order to provide a usable workspace for the save system state processing logic. This RAM area works 102 may be an area of fixed location and size within memory accessible to the SAVE_SYSTEM_STATE_A processing logic. The contents of RAM area workspace 102 are read (processing block 307) from main memory 110 stored in save RAM area 105 in system management area 122. RAM area workspace 102 in main memory 110 may thereafter be cleared and made available to the save system state processing logic for use as a stack or parameter block or for any other purpose. Referring again to FIG. 9, once the contents of RAM area workspace 102 have been read in processing block 307 and written to save RAM area 105 (processing block 308), RAM area workspace 102 may be cleared in processing block 309. Processing continues at the bubble labeled D illustrated in FIG. 10.

Figure 10:
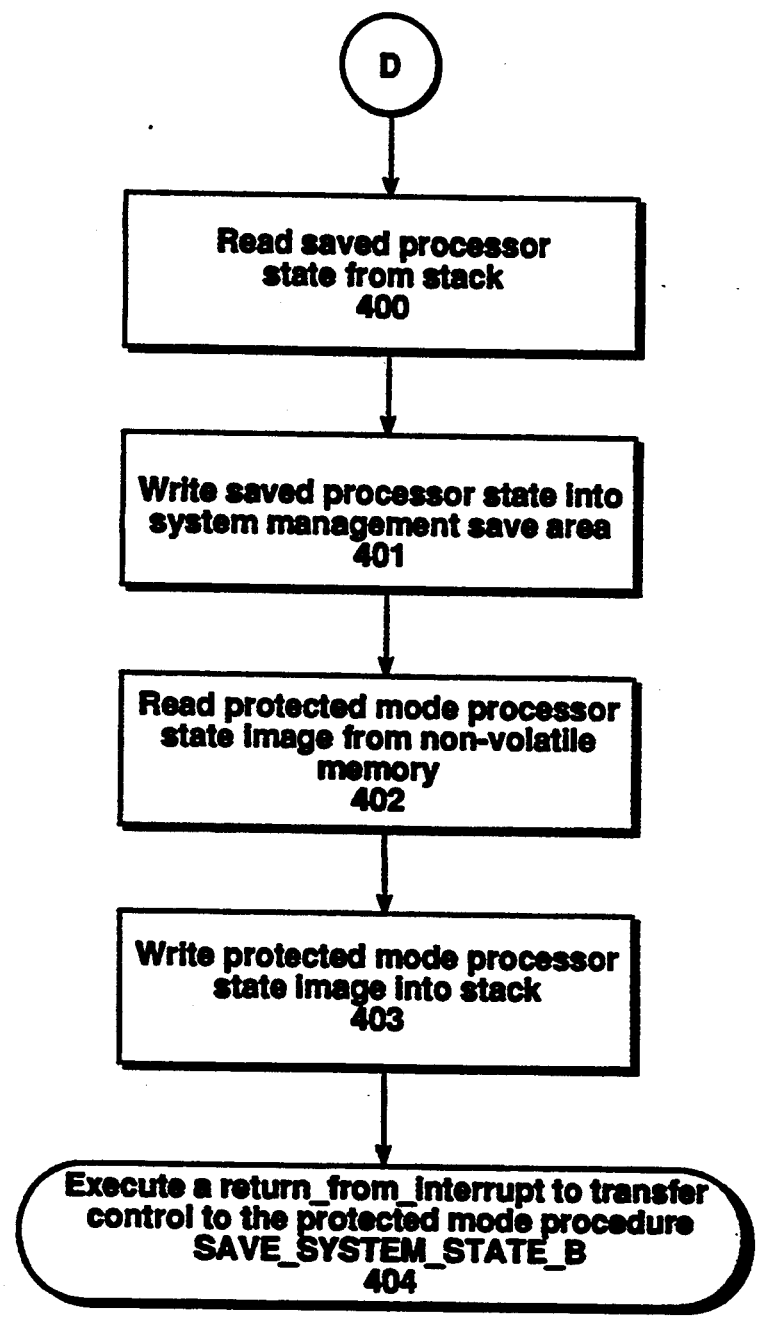

Referring now to FIG. 10, processing for the SAVE_SYSTEM_STATE_A module continues at processing block 400. At this point in the save system operation, the contents of the RAM area workspace 40 have been saved in memory block 105. The device registers and state parameters of the nonvolatile mass storage device 117 (and the state of other required system resources) have been saved in memory block 106 within main memory 110. It is now desirable to begin writing memory blocks to nonvolatile mass storage device 117 using RAM area workspace 102 as a stack or a parameter block area; however, the SAVE_SYSTEM_STATE_A module will be unable to perform this operation for two reasons. First, because the SAVE_SYSTEM_STATE_A module is an interrupt handler, this module will be usable to receive interrupts from nonvolatile mass storage device 117. Secondly, the SAVE_SYSTEM_STATE_A module will be unable to access extended memory 109 because the SAVE_SYSTEM_STATE_A module does not operate in a protected mode. For these reasons, the SAVE_SYSTEM_STATE_A module must transfer processing control to the SAVE_SYSTEM_STATE_B module.

The SAVE_SYSTEM_STATE_B module is a non-interrupt protected-mode processing module. In order to transfer control to the SAVE_SYSTEM_STATE_B modules, the processor state 103 must be modified. Prior to modification, however, the current processor state 103 must be saved in a region of system management area 122. Thus, processing block 400, illustrated in FIG. 10, is executed to read the processor state from memory block 103. The processor state stored in memory block 104 is transferred to a save processor state memory block 104 (processing block 401). This processor state just saved in memory block 104 corresponds to the return from interrupt address of the application program executing when the save system state triggering event was activated. Now that the processor state in memory block 103 has been saved, a processor state corresponding to a transfer of processing control to the SAVE_SYSTEM_STATE_B module can be written to processor state memory block 103. This processor state corresponding to a transfer to the SAVE_SYSTEM_STATE_B module (also called the protected mode processor state) resides in memory block 114 of nonvolatile memory 120. The protected mode processor state image is read from memory block 114 in processing block 402 and transferred to processor state memory block 103 in processing block 403. A RETURN_FROM_INTERRUPT instruction can now be executed by the SAVE_SYSTEM_STATE_A module which causes a transfer of processing control to the SAVE_SYSTEM_STATE_B module. This transfer of control is illustrated in FIG. 2 by arrow 119 and in FIG. 10 at processing bubble 404. Once this transfer occurs, processing continues with the SAVE_SYSTEM_STATE_B module in a non-interrupt protected processing mode as illustrated starting in FIG. 11.

The protected mode processor state image 114 residing in nonvolatile memory 120 is the key to a successful transfer between the SAVE_SYSTEM_STATE_A interrupt module and the SAVE_SYSTEM_STATE_B protected mode module. The protected mode processor state image 114 may be generated in one of several ways. First, a desired processor state image may be dynamically constructed by setting up each of the various data items that comprise a processor state image. These data items include a RETURN_FROM_INTERRUPT transfer address, register contents, and other processor context information. This dynamic approach to constructing a protected mode processor state image, however requires knowledge of the processor state image data structure. As this processor state image data structure may not always be available, an alternative approach to generating the protected mode processor state image 114 may be used which does not require knowledge of the processor state image data structure. This alternative approach uses a stand alone dummy version of the SAVE_SYSTEM_STATE_B module. This stand alone version of the SAVE_SYSTEM_STATE_B module simply generates a system management interrupt. Through the natural interrupt operation of the processor, a desired protected mode processor state image associated with a return to the SAVE_SYSTEM_STATE_B module is generated and stored in a region of the system management area 122, typically in the stack. This processor state image may then be retrieved and saved for later storage in protected mode processor state image area 114 of nonvolatile memory 120.

Referring again to FIG. 11, the processing logic for the noninterrupt protected mode SAVE_SYSTEM_STATE_B module is illustrated starting at bubble 500. First, the status, size, and location 116 of the pre-allocated mass storage save area is read from battery-backed random access memory 115 in processing block 505. The information read from battery-backed random access memory 115 is verified for consistency with the size of the system state image and the current configuration of the computer system. At the location on mass storage device 117 indicated by the status, size, and location information 116, a header previously written to the mass storage save area at battery-backed random access memory 115 configuration time identifies the save area image and its status. The contents of main memory 110, extended memory 109, expanded memory 108, and a video memory image is written to the mass storage save area in processing block 508. The device registers and state parameters of other input-output (I/O) devices or other system resources (i.e. Those devices and resources not required by the save system state operation) must be read and retained as part of the save system state operation. The device registers and state parameters associated with I/O device 123 are illustrated in block 124 of FIG. 2. The device registers and state parameters 124 of other I/O devices are written to the mass storage save area in processing block 512. The battery-backed random access memory 115 image is retrieved and written to the mass storage save area on mass storage device 117 in processing block 507.

Following the execution of processing block 507, all of the memory areas of the computer system have been written to mass storage device 117 with the exception of system management area 122. System management area 122 will not have been transferred to nonvolatile mass storage device 117, because the SAVE_SYSTEM_STATE_B module does not have access to the system management area 122. System management area 122 may only be accessed when the processor is operating in a system management interrupt (SMI) mode. Therefore, the next operation performed at processing block 509 is the generation of a system management interrupt (SMI) via processing path 514 which reactivates the interrupt logic of the present invention by transferring control to a general interrupt service handler, illustrated in FIGS. 5-8, and thereafter to an interrupt mode handler called SAVE_SYSTEM_STATE_COMPLETE illustrated in FIG. 12. The transfer of control to the general interrupt service handler is illustrated in FIG. 3 by the line 190. The transfer of control to the interrupt handler SAVE_SYSTEM_STATE_COMPLETE is illustrated in FIG. 3 by the line 191.

Upon generation of a system management interrupt in processing block 509, control is transferred to the general interrupt service handler illustrated starting in FIG. 5. As described earlier, the basic interrupt service processing starts by pushing the processor state onto the stack in processing block 202. The type of interrupt is obtained in processing block 204 and processing continues at the bubble labeled A illustrated in FIG. 6. Starting at decision block 205, the type of system management interrupt is determined (decision block 209). In this case, processing path 210 will be taken to processing block 211 and processing control will be transferred to the SAVE_SYSTEM_STATE_COMPLETE module illustrated in FIG. 12.

Figure 11:
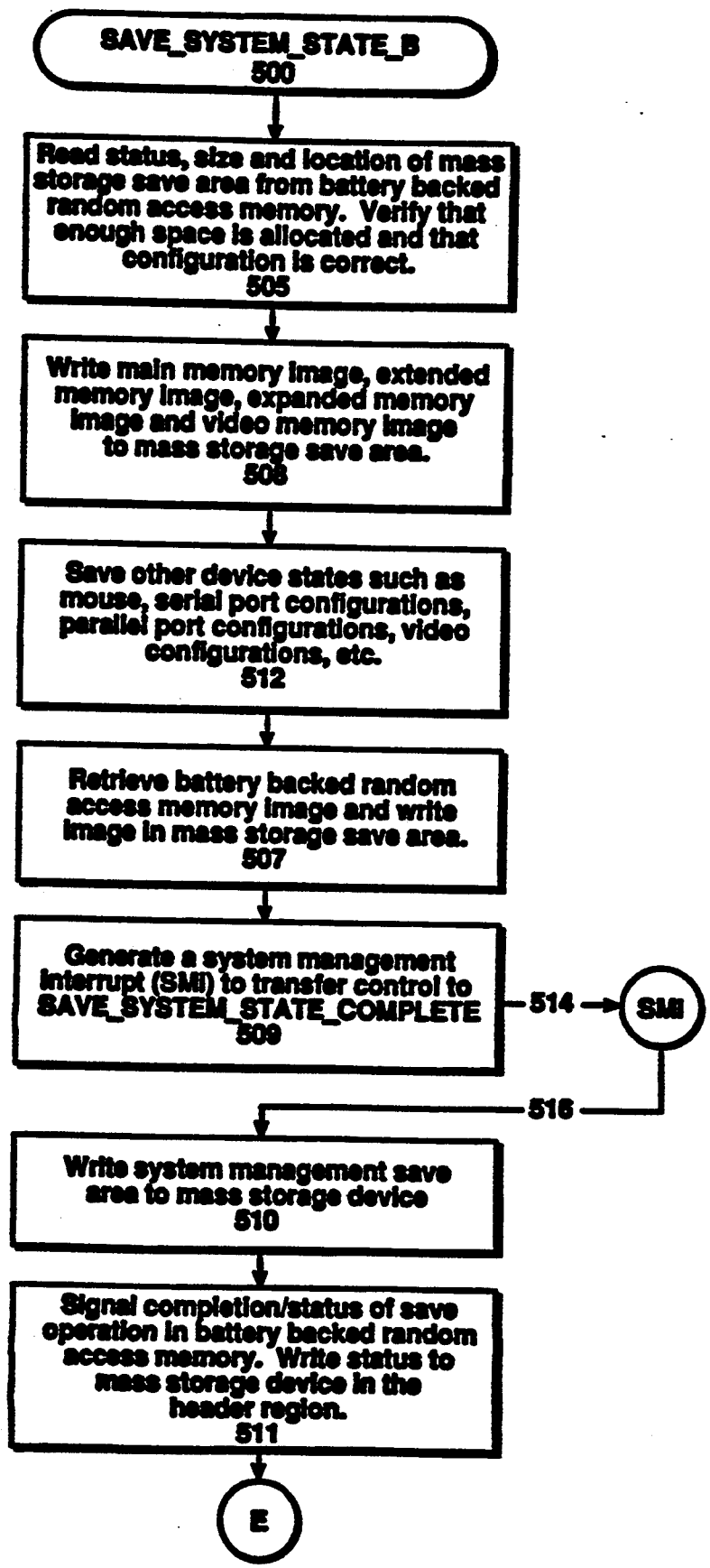
Figure 12:
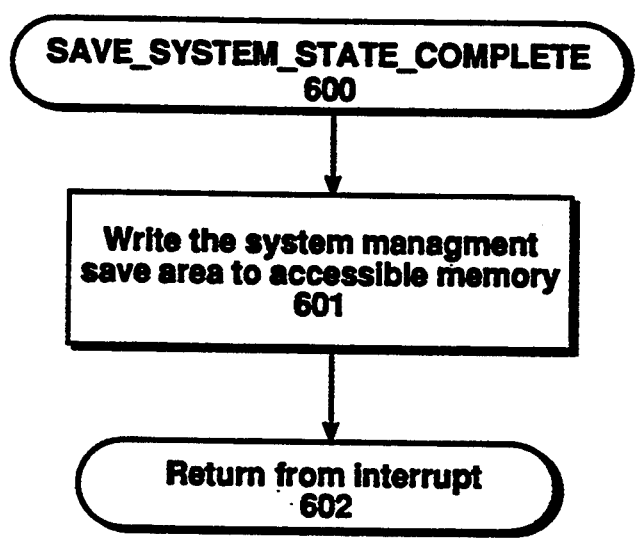

Referring now to FIG. 12, the SAVE_SYSTEM_STATE_COMPLETE module is illustrated starting at bubble 600. The main task performed by the SAVE_SYSTEM_STATE_COMPLETE module is to write the entire content of the system management area 122 into an area of main memory 110 that is not within the system management area 122 itself. A memory block 193 for the system management area image is illustrated in FIG. 3. Memory block 193 is an area accessible to the SAVE_SYSTEM_STATE_B module. The system management area 122 is written to system management area image block 193 in processing block 601 illustrated in FIG. 12. Once the system management area 122 is copied to memory area 193, a return from interrupt instruction is executed at processing bubble 602 and control is returned to the SAVE_SYSTEM_STATE_B module via processing path 516 illustrated in FIG. 11. Return of control of the SAVE_SYSTEM_STATE_B module is also illustrated in FIG. 3 by the line 192. The non-interrupt and protected mode logic of the present invention is thus reactivated.

Once control is returned to the SAVE_SYSTEM_STATE_B module, processing continues at processing block 510 illustrated in FIG. 11, where the system management area image block 193 is written to nonvolatile mass storage device 117. The successful completion of the save system state operation is indicated in the status area of block 116 in battery-backed random access memory 115. The successful completion of the save system operation is also recorded in the header portion of the system state image recorded on nonvolatile mass storage device 117 (processing block 511). Processing then continues at the bubble labeled E illustrated in FIG. 13.

Figure 13:
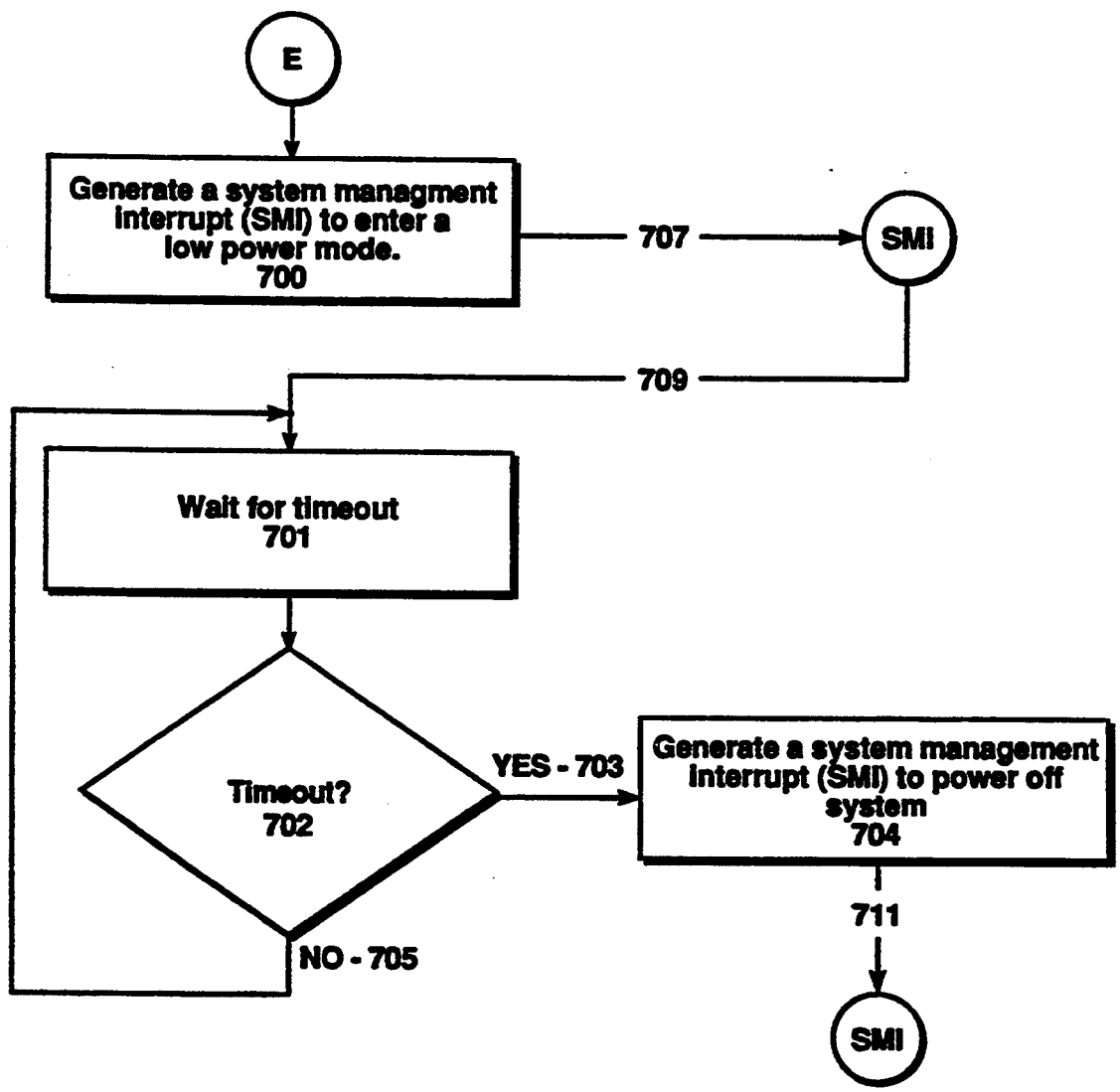

Referring now to FIG. 13, the save system state operation continues with the generation of another system management interrupt to cause the computer system to enter a low power mode. When this system management interrupt is generated, control transfers via processing path 707 to the general purpose interrupt handler illustrated in FIGS. 5-8. Referring again to FIG. 5, the general interrupt servicing is performed as described earlier with the exception that this time processing path 239 as illustrated in FIG. 6 is taken to a processing block 240 where low power mode is initiated. The activation of a low power mode is a technique well known to those of ordinary skill in the art. Once low power mode is initiated, processing continues at the bubble labeled C illustrated in FIG. 8 where a return from interrupt instruction (processing bubble 222) is executed. Upon execution of the return from interrupt instruction at processing bubble 222, control returns to processing block 701 in FIG. 13 via processing path 709 where a time out counter is initiated. Execution control will remain suspended between processing block 701 and decision block 702 for a predetermined length of time. This period of time enables the computer user to resume operation of the computer system from low power mode. If, however the user does not resume operations after the predetermined length of time has expired, processing path 703 is taken to processing block 704 where another system management interrupt is generated via processing path 711 to power off the system completely.

Once the system management interrupt is generated in processing block 704, control is again transferred to the general interrupt servicing routine illustrated in FIGS. 5-8 and thereafter to decision block 235 illustrated in FIG. 6. Processing path 236 is taken to processing block 237 where the computer system is powered off using well known techniques.

Figure 20:
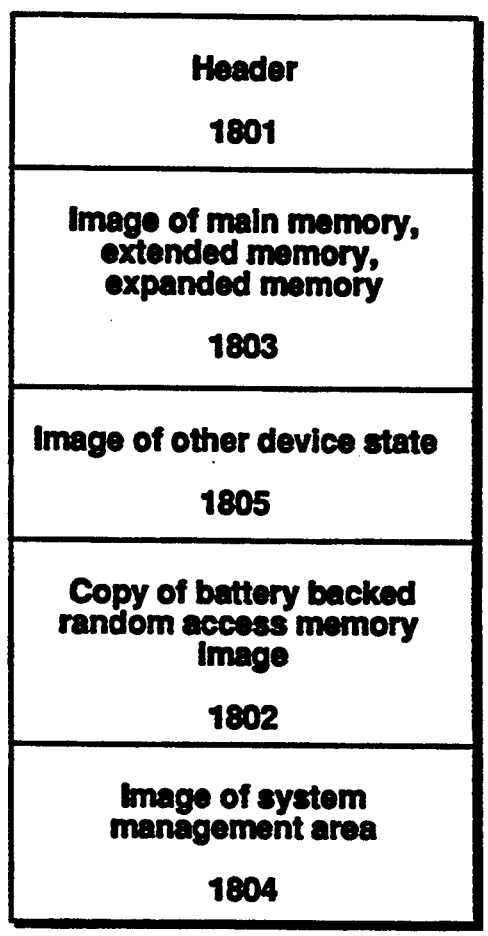

Having completed the save system state operation, an image of the computer system processing state now exists on the nonvolatile mass storage device 117. This system state image on the mass storage device 117 is organized as illustrated in FIG. 20. Thus, a header 1801 followed by the image 1803 of each partition of memory followed by the saved device registers and state parameters of other I/O devices image 1805 followed by the battery-backed random access memory 115 image 1802 followed by followed by the image 1804 of the system management area is written on nonvolatile mass storage device 117. Thus, the save system state operation of the preferred embodiment of the present invention is described.

In an alternative implementation of the present invention, the need to execute a portion of the processing logic in protected mode is avoided. The constraint assumed in the preferred embodiment described above was that the extended memory area 109 could not be directly accessed by the non-protected mode SAVE_SYSTEM_STATE_A module. There is a means in the prior art, however for remapping the addressing space allocated for expanded memory 108 so that the entirety of extended memory 109 is included within the address space associated with expanded memory 108. In this configuration, the SAVE_SYSTEM_STATE_A module may access extended memory 109. Thus, execution of the SAVE_SYSTEM_STATE_B module in protected mode would not be necessary.

Referring now to FIGS. 7, 8 and 14 through 19, the processing logic of the preferred embodiment of the present invention for performing a restore system state operation is illustrated. In addition, FIG. 4 illustrates various memory areas used by the processing logic of the restore system state operation. In the preferred embodiment, the processing state of the computer system of the preferred embodiment may be restored from an image previously saved on a nonvolatile mass storage device in one of two ways. First, the computer system may be powered up or a hardware reset of the system may be initiated. Secondly, for a computer system still powered up, but currently in a low power or suspended state, a resume operation event may be initiated in one of two ways. The first way to resume operation is the activation of a resume button. Such a resume button, for example, may be activated upon opening the lid of a laptop or portable personal computer. Another way of resuming operation is an activation of any key on a keyboard coupled to the computer system or the activation of a mouse device coupled to the computer system. An activation of an input device coupled to the computer system in this way indicates the resumption of activity by a computer user after a period of inactivity.

Figure 7:
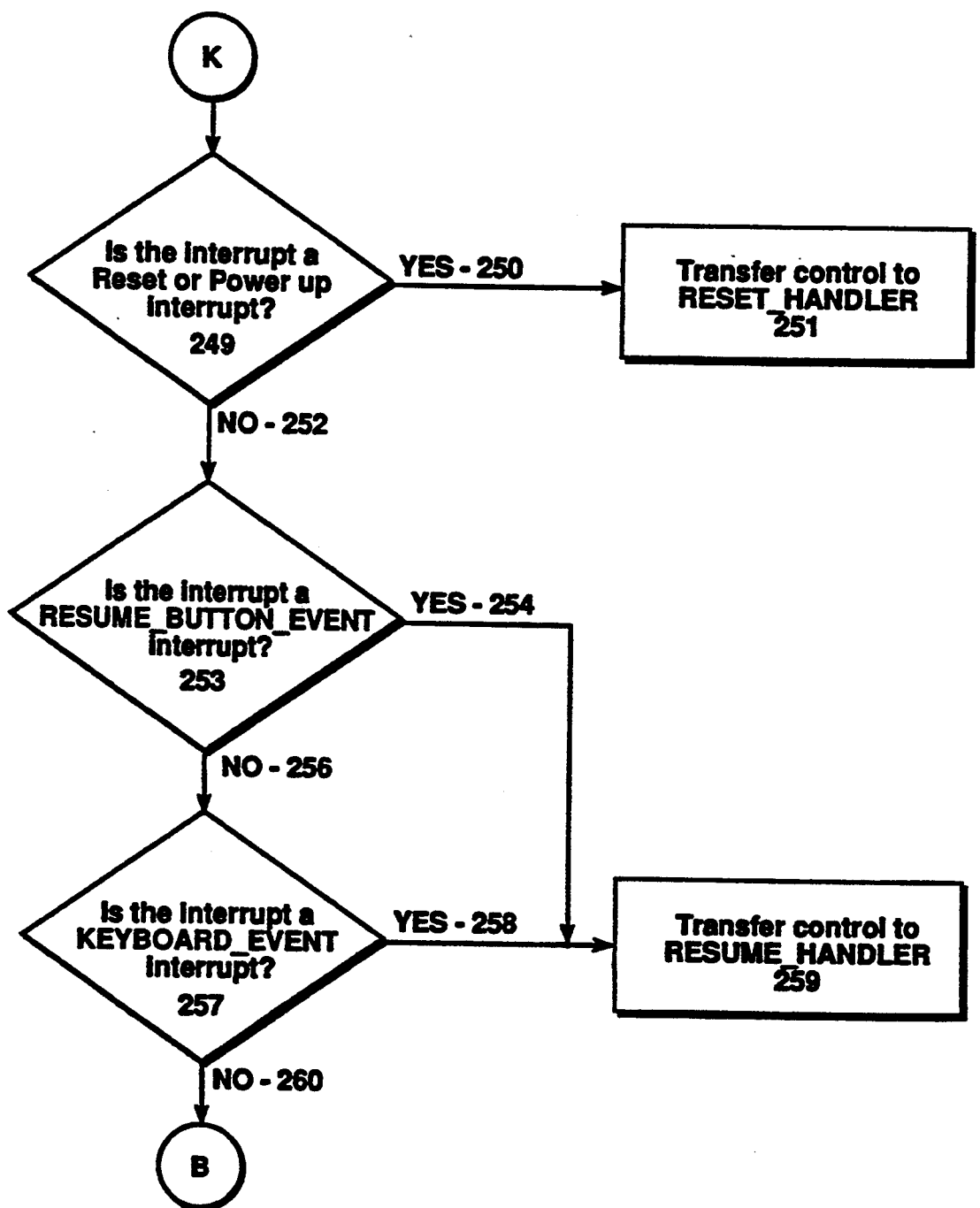
Figure 14:
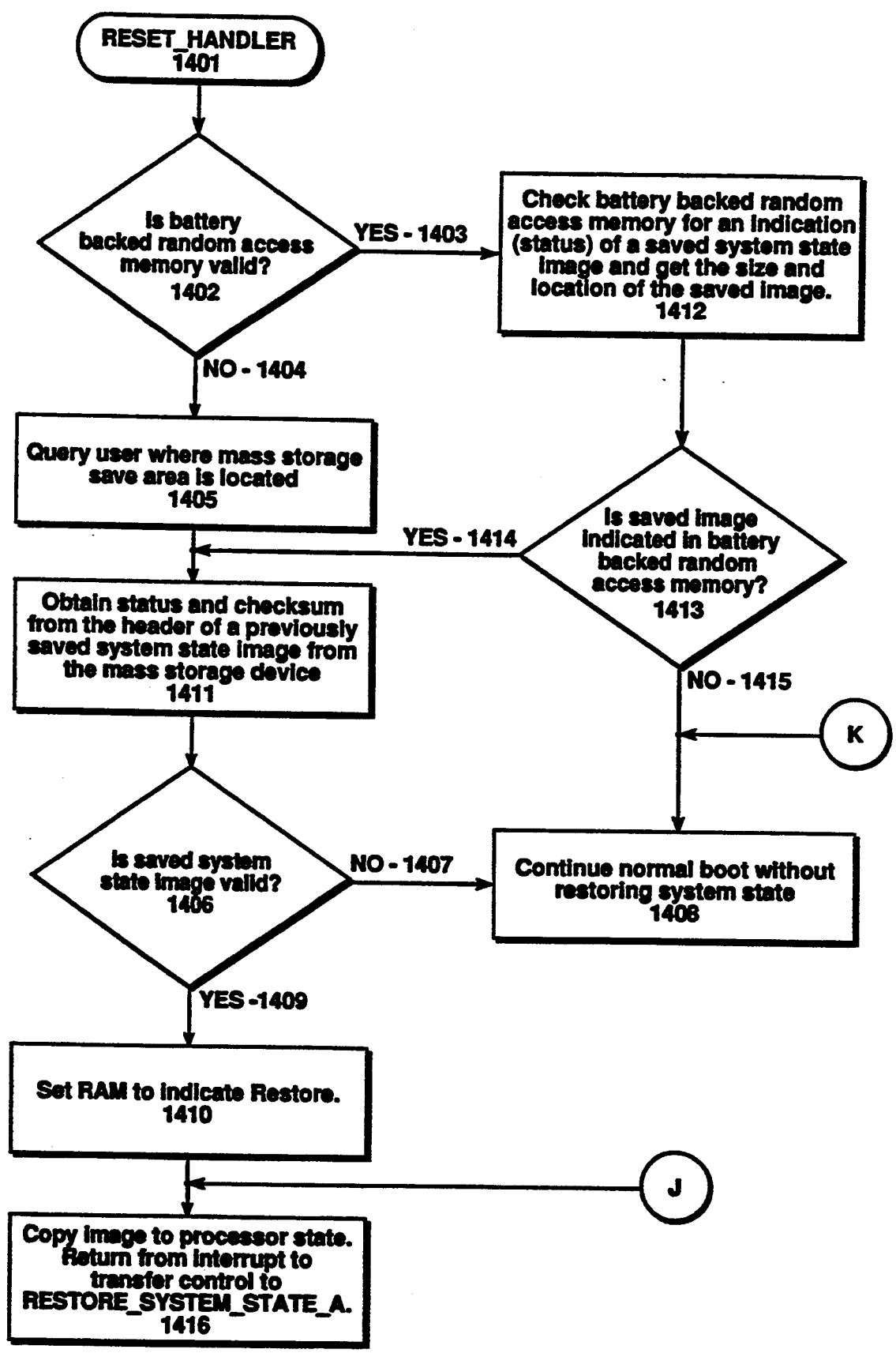

For a restore system state operation initiated upon a reset or power up event or a resume event, processing control is transferred to the general interrupt service processing logic illustrated in FIG. 5–8 and thereafter to decision block 249 illustrated in FIG. 7. If the interrupt so generated is a reset or power up interrupt, processing path 250 is taken to processing block 251 where processing control is transferred to a module denoted RESET_HANDLER. The RESET_HANDLER module is illustrated in FIG. 14. Referring now to FIGS. 14 and 4, the processing logic for a reset or power up event is illustrated. Starting at the bubble labeled RESET_HANDLER 1401, the first action performed at decision block 1402 is to check the battery-backed random access memory 115 to determine if the content of battery-backed random access memory 115 is valid. Such a determination may be made by comparing a checksum value (not shown) in battery-backed random access memory 115 with a known checksum value previously computed. If battery-backed random access memory 115 is valid (processing path 1403), the status, size and location of the mass storage save area stored in memory block 166 of battery-backed random access memory 115 (as illustrated in FIG. 4), is read from battery-backed random access memory 115 (processsing block 1412). If, in decision block 1413, the status information read from battery-backed random access memory 115 indicates that a save image exists on nonvolatile mass storage device 167, processing path 1414 is taken to processing block 1411. If, however, the status information indicates a non-existent save image, processing path 1415 is taken to processing block 1408 where a normal system boot up occurs without the use of a previously saved system image. Referring again to decision block 1402, if battery-backed random access memory 115 is not valid (processing path 1404), the computer user is queried (processing block 1405) for the location of a system state save area on nonvolatile mass storage device 167 and control passes to processing block 1411.

Once the location and status of the system state save area on mass storage device 167 is determined either from battery-backed random access memory 115 or the computer user, the header of the system state save area on mass storage device 167 is read (processing block 1411). If the system state image on mass storage device 167 is valid (decision block 1406), as determined by checking a checksum retrieved from the header, processing path 1409 is taken to processing block 1410 where a data item is set (processing block 1410) to indicate the activation of a restore system state operation. This data item may be stored in random access memory workspace area 152. Next, a protected mode processor state image stored in memory area 164 is transferred to processor state area 103 and a return from interrupt instruction is executed (processing block 1416). The protected mode processor state image 164 is pregenerated and stored in battery-backed random access memory 115 during memory configuration time in a manner similar to the protected mode processor state image 114 described above for the save system state operation. The actions performed in processing block 1416 result in a transfer of processing control to a module denoted RESTORE_SYSTEM_STATE_A illustrated in FIG. 15. This transfer of control is illustrated in FIG. 4 by line 151.

Referring now to FIG. 15, the RESTORE_SYSTEM_STATE_A module is illustrated starting at bubble 800. The RESTORE_SYSTEM_STATE_A module is a noninterrupt protected mode processing module residing in non-isolated memory. The RESTORE_SYSTEM_STATE_A module is also shown in FIG. 4 as located within memory block 182. Activation of the RESTORE_SYSTEM_STATE_A module is indicated by arrow 151.

Upon activation, the RESTORE_SYSTEM_STATE_A module determines if the current operation is a restore system state operation or a resume operation (processing block 801). An operation type parameter may be stored in random access memory and used to specify the type of operation currently active. If the resume operation is active, processing path 803 is taken to the bubble labeled I as illustrated in FIG. 17. If the restore system state operation is active, processing path 802 is taken to processing block 806 where the RESTORE_SYSTEM_STATE_A processing logic reads the header from the saved system state image previously saved on nonvolatile mass storage device 167 (processing block 806 of FIG. 15). The configuration of memory areas saved in the mass storage device save area is compared (decision block 809) with the configuration of memory areas currently existing in the computer system. If the saved image is not compatible with the current computer system configuration, processing path 810 is taken to the bubble labeled K illustrated in FIG. 14 where a normal boot up without a restore system image is performed. If the save image is compatible with the current computer system configuration, processing path 811 is taken to processing block 807 where the system management save image area is retrieved from mass storage device 167 and written to an area (not shown) of main memory 160 (processing block 807) which is accessible to a module denoted the RESTORE_SYSTEM_MANAGEMENT_AREA. As described earlier in the description of the save system state operation, the system management area 172 (isolated memory) cannot be directly restored by the RESTORE_SYSTEM_STATE_A module; because, the RESTORE_SYSTEM_STATE_A module is not an interrupt processing module. For this reason, a system management interrupt (SMI) must be generated to transfer control to an interrupt handler denoted RESTORE_SYSTEM_MANAGEMENT_AREA (processing block 808). Upon generation of the system management interrupt (SMI) in processing block 808, processing control is transferred via processing path 815 to the general interrupt handler illustrated in FIGS. 5-8 and described above. Thereafter, control is transferred to decision block 213 illustrated in FIG. 8. In response to the system management interrupt generated in processing block 808, control is transferred via processing path 815 and processing path 214 to an interrupt handler denoted RESTORE_SYSTEM_MANAGEMENT_AREA illustrated in FIG. 16.

Figure 16:
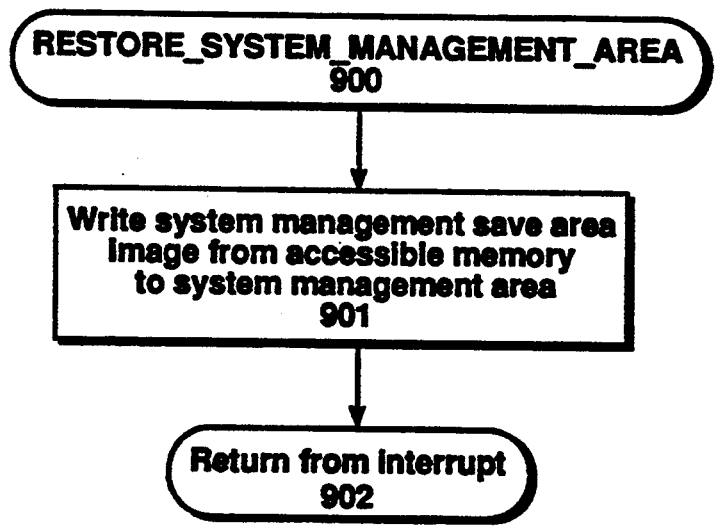
Figure 17:
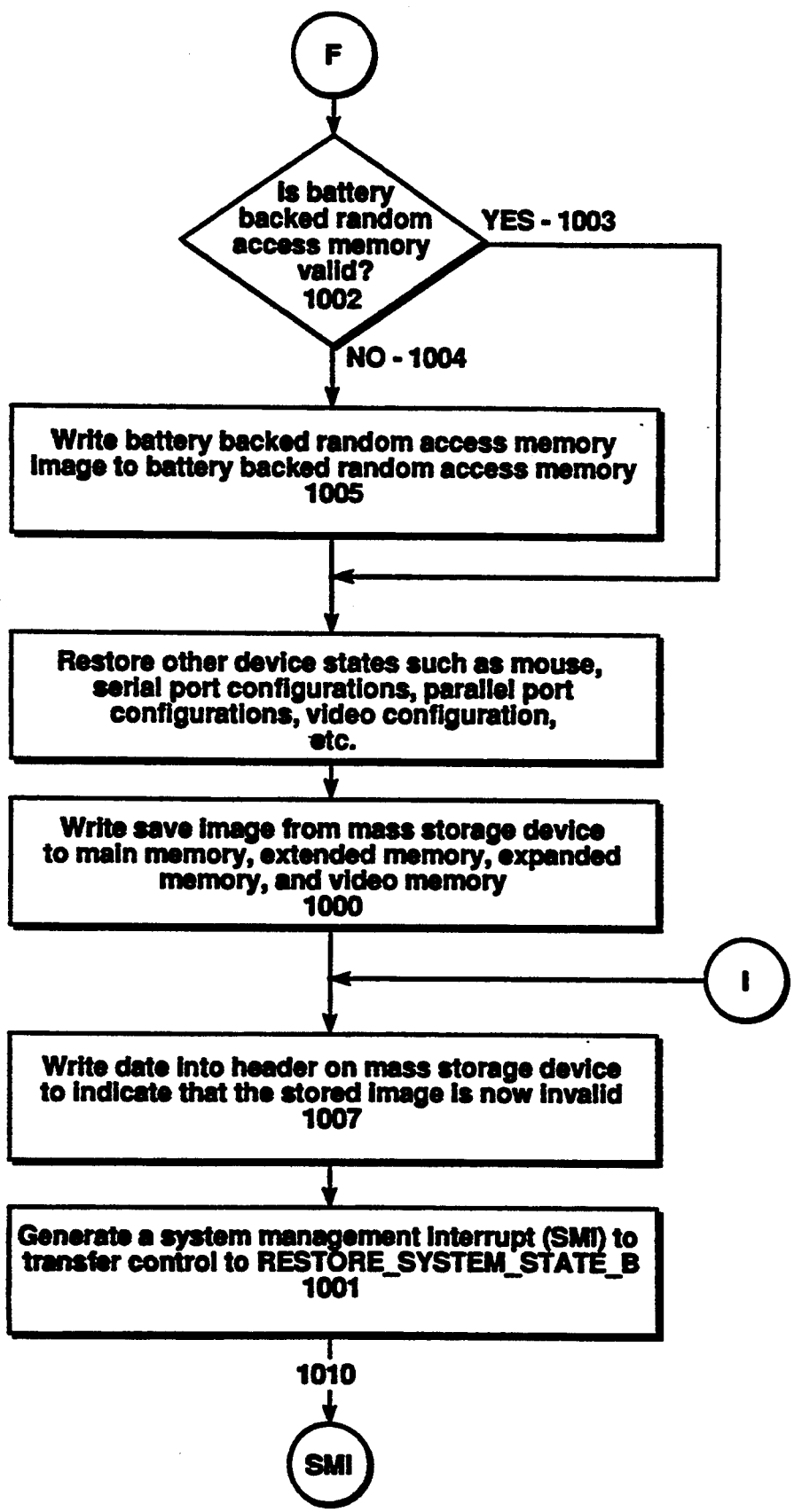

Referring now to FIG. 16, the interrupt handler denoted RESTORE_SYSTEM_MANAGEMENT_AREA is illustrated starting at bubble 900. Upon activation, the system management save area image previously written to an accessible area of main memory 160 is retrieved and written to system management area 172 in processing block 901. Processing for the RESTORE_SYSTEM_MANAGEMENT_AREA interrupt handler is terminated in bubble 902 with a return from interrupt. Once the return from interrupt instruction is executed in bubble 902, control returns, via processing path 816 illustrated in FIG. 15, to a location just after processing block 808 where control is transferred to the bubble labeled F illustrated in FIG. 17.

Referring now to FIG. 17, the continuation of reactivation of processing for the noninterrupt and protected mode processing routine denoted RESTORE_SYSTEM_STATE_A is illustrated starting at decision block 1002. If battery-backed random access memory 115 is invalid (processing path 1004), the battery-backed random access memory 115 image is read from mass storage device 167 and written to battery-backed random access memory 115 in processing block 1005. If battery-backed random access memory 115 is valid (processing path 1003), processing control passes to processing block 1006 without restoring the contents of battery-backed random access memory 115 from mass storage device 167. Next, the device registers and state parameters of I/O devices and system resources not required by the restore system state operation are restored from mass storage device 167 in processing block 1006. Having restored the state of the other I/O devices and system resources, the remainder to the memory block images stored on nonvolatile mass storage device 167 are retrieved and written to their corresponding locations in computer system memory (processing block 1000). Specifically, main memory 160, extended memory 159, expanded memory 158, and video memory (not shown) is restored from the saved image on mass storage device 167. Finally, the header of the save area on nonvolatile mass storage device 167 is marked to indicate that the saved image is now invalid (processing block 1007).

Figure 18:
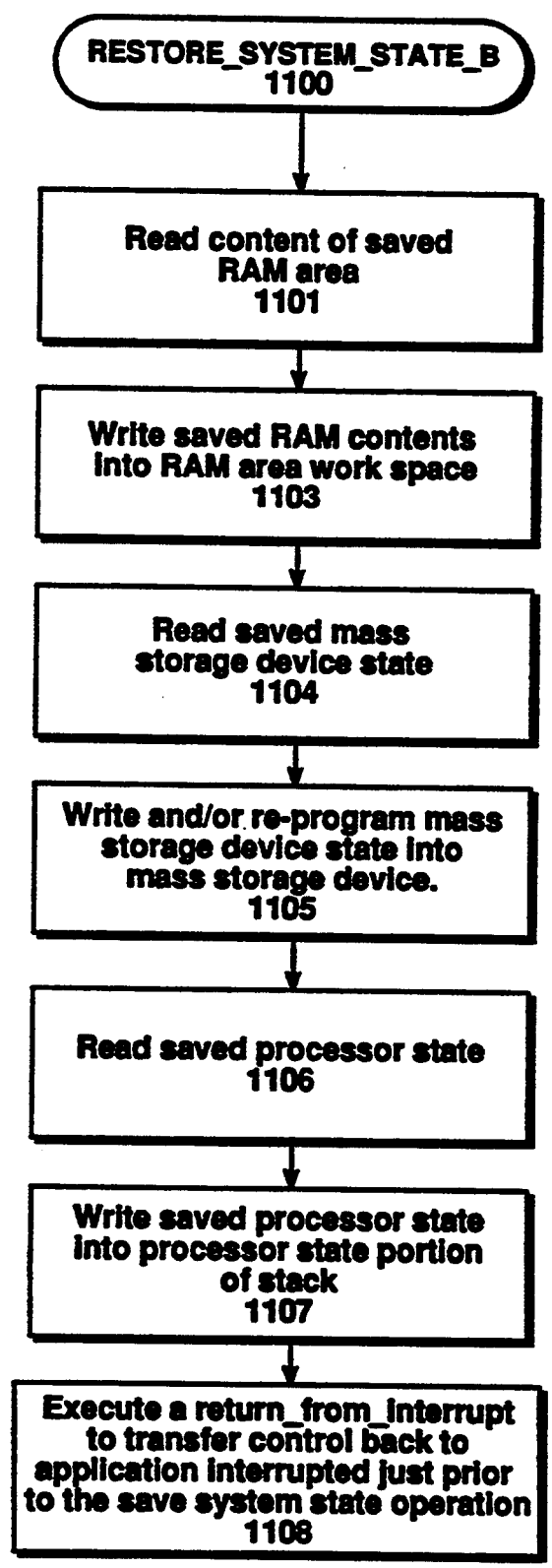

Having restored the memory areas described above, it now becomes necessary to restore the state of the nonvolatile mass storage device 167 and the contents of the random access memory workspace area 152. These areas must be stored using an interrupt and nonprotected mode processing module. In order to activate such a module, another system management interrupt (SMI) is used to reactivate the interrupt logic of the present invention by transferring control to an interrupt handler and nonprotected mode module denoted RESTORE_SYSTEM_STATE_B (processing block 1001). The RESTORE_SYSTEM_STATE_B module resides in isolated memory. Upon activation of the system management interrupt in processing block 1001, processing control is again transferred via processing path 1010 to the general interrupt handler illustrated in FIGS. 5-8 and thereafter transferred to decision block 217 illustrated in FIG. 8. In response to the system management interrupt generated in processing block 1001, processing path 1010 and processing path 218 is taken to an interrupt handler module denoted RESTORE_SYSTEM_STATE_B as illustrated in FIG. 18. The system management interrupt generated in processing block 1001 and the subsequent transfer of control to the general interrupt handler is depicted by line 169 in FIG. 4. The transfer of control from the general interrupt service handler to the RESTORE_SYSTEM_STATE_B processing module is depicted by line 171 in FIG. 4.

Referring now to FIG. 18, the processing logic for the RESTORE_SYSTEM_STATE_B processing module is illustrated. The RESTORE_SYSTEM_STATE_B module is an interrupt handler operating within the system management area 172 (isolated memory) in a nonprotected mode. The first task performed by the RESTORE_SYSTEM_STATE_B module is to restore the saved random access memory (RAM) area workspace 152 from the system management saved RAM area 155 as illustrated in FIG. 4. The RAM area workspace 152 is restored in processing block 1101 and 1103 illustrated in FIG. 18. Similarly, the device registers and state parameters 168 of nonvolatile mass storage device 167 are restored from the saved mass storage device state 156 in system management area 172 as illustrated in FIG. 4. The mass storage device state is restored in processing blocks 1104 and 1105 of FIG. 18. Finally, the processor state 153 of system management area 172 is restored from the saved processor state 154 also within system management area 172 as illustrated in FIG. 4. The saved processor state 154 represents the processor state of the application or other program executing when a save system state trigger even occurred thereby causing the computer system state to be saved on nonvolatile mass storage device 167. The processor state 153 is restored in processing blocks 1106 and 1107 of FIG. 18.

Having completed the restoration of the entire computer system state, a return from interrupt instruction is now executed in processing block 1108 illustrated in FIG. 18. The action of this return from interrupt instruction is also illustrated in FIG. 4 by line 170. Upon execution of the return from interrupt instruction in processing block 1108, the processor state 153 is accessed to transfer control back to the application or other program operating upon the occurrence of a save system state triggering event, thus completing the restore system state operation.

Figure 19:
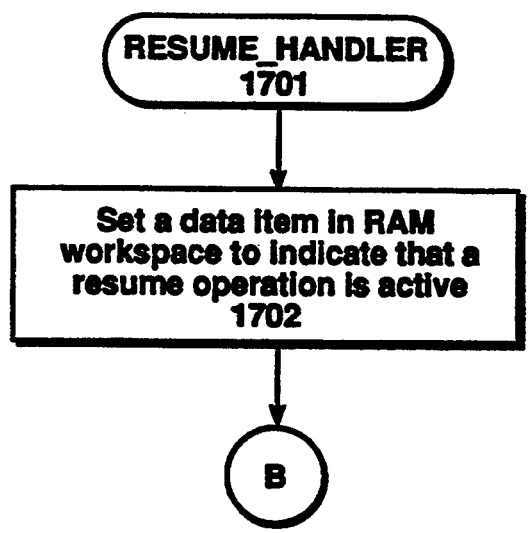

Referring now to FIG. 19, the processing logic associated with a resume operation is illustrated. A resume operation is performed upon the occurrence of a resume event such as the activation of a resume button (i.e., the opening of the lid of a laptop computer), the activation of any key on keyboard attached to the computer system, or the activation of any other input device coupled to the computer system. The resume operation is performed to reactivate a computer system previously suspended or placed in a low power mode. Upon activation of a resume event, an interrupt occurs and processing control is transferred to the general interrupt service handler illustrated in FIGS. 5-8 and thereafter to decision block 253 illustrated in FIG. 7. If either a resume button event or a keyboard event (or other input device event or resume event) occurs, processing path 254 (for a resume button event) or processing path 258 (for a keyboard or mouse event) is taken to processing block 259 where processing control is transferred to a resume handler interrupt module denoted RESUME_HANDLER. The RESUME_HANDLER module is illustrated in FIG. 19.

Referring again to FIG. 19, the RESUME_HANDLER module is illustrated starting in bubble 1701. Because operation of the computer system is being resume from a low power mode or a previously suspended state, most of the contents of memory and the state of I/O devices and system resources is still valid. A suspended state or low power mode protects system memory and registers from destruction. Thus, in this case, it is not necessary to restore the complete contents of memory of registers from the previously saved system state image on nonvolatile mass storage device 167. For this reason, the system state image saved on mass storage device 167 is not longer needed. In this case, a data item in random access memory is set to indicate the activation of a resume mode in processing block 1702. This data item may be stored in random access memory workspace area 152. Once RAM workspace area 152 is marked for a resume operation, processing control is then transferred to the bubble labeled J illustrated in FIG. 14.

At the bubble labeled J in FIG. 14 (processing block 1416), a protected mode processor state image stored in memory area 164 is transferred to processor state area 103 and a return from interrupt instruction is executed (processing block 1416). The protected mode processor state image 164 is pre-generated and stored in battery-backed random access memory 115 during memory configuration time in a manner similar to the protected mode processor state image 114 described above for the save system state operation and the restore system state operation. The actions performed in processing block 1416 result in a transfer of processing control to a module denoted RESTORE_SYSTEM_STATE_A illustrated in FIG. 15. This transfer of control is illustrated in FIG. 4 by line 151.

Referring now to FIG. 15, the RESTORE_SYSTEM_STATE_A module is illustrated starting at bubble 800. The RESTORE_SYSTEM_STATE_A module is a noninterrupt protected mode processing module. The RESTORE_SYSTEM_STATE_A module is also shown in FIG. 4 as located within memory block 182. Activation of the RESTORE_SYSTEM_STATE_A module is indicated by arrow 151.

Upon activation, the RESTORE_SYSTEM_STATE_A module determines if the current operation is a restore system state operation or a resume operation (processing block 801). In this case, the resume operation is active, because a data item in RAM workspace area 152 was previously set to indicate a resume operation. Thus, processing path 803 is taken to the bubble labeled I as illustrated in FIG. 17.

Referring to the bubble labeled I as illustrated in FIG. 17, the header of the save area on nonvolatile mass storage device 167 is marked to indicate that the saved image is now invalid (processing block 1007). This is done to prevent the restoration of an old system state. In order to complete the resume operation, it now becomes necessary to restore the state of the nonvolatile mass storage device 167 and the contents of the random access memory workspace area 152. These areas must be restored using an interrupt and nonprotected mode processing module. In order to activate such a module, another system management interrupt (SMI) is used to reactivate the interrupt logic of the present invention by transferring control to an interrupt handler and nonprotected mode module denoted RESTORE_SYSTEM_STATE_B (processing block 1001). Upon activation of the system management interrupt in processing block 1001, processing control is again transferred via processing path 1010 to the general interrupt handler illustrated in FIGS. 5-8 and thereafter transferred to decision block 217 illustrated in FIG. 8. In response to the system management interrupt generated in processing block 1001, processing path 1010 and processing path 218 is taken to an interrupt handler module denoted RESTORE_SYSTEM_STATE_B as illustrated in FIG. 18. The system management interrupt generated in processing block 1001 and the subsequent transfer of control to the general interrupt handler is depicted by line 169 in FIG. 4. The transfer to control from the general interrupt service handler to the RESTORE_SYSTEM_STATE_B processing module is depicted by line 171 in FIG. 4.

Referring now to FIG. 18, the processing logic for the RESTORE_SYSTEM_STATE_B processing module is again illustrated for use in the resume operation. The RESTORE_SYSTEM_STATE_B module is an interrupt handler operating within the system management area 172 in a nonprotected mode. The first task performed by the RESTORE_SYSTEM_STATE_B module is to restore the save random access memory (RAM) area workspace 152 from the system management saved RAM area 155 as illustrated in FIG. 4. The RAM area workspace 152 is restored in processing blocks 1101 and 1103 illustrated in FIG. 18. Similarly, the device registers and state parameters 168 of nonvolatile mass storage device 167 are restored from the saved mass storage device state 156 in system management area 172 as illustrated in FIG. 4. The mass storage device state is restored in processing block 1104 and 1105 of FIG. 18. Finally, the processor state 153 of system management area 172 is restored from the saved processor state 154 also within system management area 172 as illustrated in FIG. 4. The saved processor state 154 represents the processor state of the application or other program executing when a save system state trigger event occurred thereby causing the computer system state to be saved on nonvolatile mass storage device 167. The processor state 153 is restored in processing blocks 1106 and 1107 of FIG. 18.

Having completed the restoration of the entire computer system state, a return from interrupt instruction is now executed in processing block 1108 illustrated in FIG. 18. The action of this return from interrupt instruction is also illustrated in FIG. 4 by line 170. Upon execution of the return from interrupt instruction in processing block 1108, the processor state 153 is accessed to transfer control back to the application or other program operating upon the occurrence of a save system state triggering event, thus completing the resume system state operation.

Thus, a computer system is described wherein the processing state of the system may be saved and restored on a mass storage device upon the occurrence of a triggering event.

Although the invention has been described herein with reference to a specific preferred embodiment, many modifications and variations therein will readily occur to those skilled in the art. Accordingly, all such variations and modifications are included within the intended scope of the present invention as defined by the following claims.

We claim:

1. In a computer system for operating in a protected and a nonprotected mode having a processor, a memory, and a nonvolatile mass storage device, said nonprotected mode including a system management interrupt mode, said memory being partitioned into an isolated memory and a non-isolated memory, said isolated memory being only accessible from said system management interrupt mode, said non-isolated memory being partitioned into a first portion of non-isolated memory that can only be accessed when said processor is operating in said protected mode and a second portion of non-isolated memory that can be accessed when said processor is operating in either said protected or nonprotected mode, a process for saving the processing state of said computer system, said process comprising the steps of:

interrupting the execution of said processor upon the occurrence of a triggering event, said triggering event forcing said processor to operate in said system management interrupt mode;

activating a first save system state module, said first save system state module operating in said system management interrupt mode, said first save system state module having access to said isolated memory and said second portion of non-isolated memory, said first save system state module writing information from said isolated memory into said second portion Of non-isolated memory; and activating a second save system state module, said second save system state module operating in said protected mode, said second save system state module having access to said first and second portion of non-isolated memory, said second save system state module writing information from said non-isolated memory to a predetermined location on said nonvolatile mass storage device.

2. The process as claimed in claim 1 further including the step of:

transferring control from said first save system state module to said second save system state module by modifying processor state information.

3. The process as claimed in claim 1 further including the step of:

transferring control from said second save system state module to said first save system state module by generating an interrupt.

4. The process as claimed in claim 1 further including the step of:

entering a low power mode.

5. The process as claimed in claim 1 further including the step of:

automatically powering off said computer system from a low power mode after a time-out period has elapsed.

6. In a computer system for operating in a protected and a nonprotected mode having a processor, a memory, and a nonvolatile mass storage device, said nonprotected mode including a system management interrupt mode, said memory being partitioned into an isolated memory and a non-isolated memory, said isolated memory being only accessible from said system management interrupt mode said non-isolated memory being partitioned into a first portion of non-isolated memory that can only be accessed when said processor is operating in said protected mode and a second portion of non-isolated memory that can be accessed when said processor is operating in either said protected or nonprotected mode, a process for restoring the processing state of said computer system, said process comprising the steps of:

resetting said processor;

activating a first restore system state module, said first restore system state module operating in said system management interrupt mode, said first restore system state module having access to said isolated memory and said second portion of non-isolated memory, said first restore system state module writing information from said second portion of non-isolated memory into said isolated memory; and activating a second restore system state module, said second restore system state module operating in said protected mode, said second restore system state module having access to said first and second portion of non-isolated memory, said second restore system state module writing information from a predetermined location on said nonvolatile mass storage device to said first and second portion of non-isolated memory.

7. The process as claimed in claim 6 further including the step of:

transferring control from said first restore system state module to said second restore system state module by modifying processor state information.

8. The process as claimed in claim 6 further including the step of:

transferring control from said second restore system state module to said first restore system state module by generating an interrupt.

9. The process as claimed in claim 6 further including the step of:

returning processing control to a previously executing program.

10. The process as claimed in claim 6 further including a step of resuming operation of said computer system from a low power mode, said step of resuming being performed without reading a complete saved system state image stored on said nonvolatile mass storage device.

11. The process as claimed in claim 6 further including the steps of:

determining if the contents of a battery backed random access memory is valid.

12. In a computer system for operating in a protected and nonprotected mode having a processor, a memory, and a nonvolatile mass storage device, said nonprotected mode including a system management interrupt mode, said memory being partitioned into an isolated memory and a non-isolated memory, said isolated memory being only accessible from said system management interrupt mode, said non-isolated memory being accessible when said processor is operating in either said protected or nonprotected mode, a process for saving the processing state of said computer system, said process comprising the steps of:

interrupting the execution of said processor upon the occurrence of a triggering event, said triggering event forcing said processor to operate in said system management interrupt mode;

activating a first save system state module, said first save system state module operating in said system management interrupt mode, said first save system state module having access to said isolated memory and said non-isolated memory, said first save system state module writing information from said isolated memory into said non-isolated memory; and activating a second save system state module, said second save system state module operating in said nonprotected mode, said second save system state module having access to said non-isolated memory, said second save system state module writing information from said non-isolated memory to a predetermined location on said nonvolatile mass storage device.

13. The process as claimed in claim 12 further including the step of:

transferring control from said first save system state module to said second save system state module by modifying processor state information.

14. The process as claimed in claim 12 further including the step of:

transferring control from said second save system state module to said first save system state module by generating an interrupt.

15. The process as claimed in claim 12 further including the step of:

entering a low power mode.

16. The process as claimed in claim 12 further including the step of:

automatically powering off said computer system from a low power mode after a time-out period has elapsed.

17. In a computer system for operating in a protected and a nonprotected mode having a processor, a memory, and a nonvolatile mass storage device, said nonprotected mode including a system management interrupt mode, said memory being partitioned into an isolated memory and a non-isolated memory, said isolated memory being only accessible from said system management interrupt mode, a process for restoring the processing state of said computer system, said process comprising the steps of:

resetting said processor;

activating a first restore system state module, said first restore system state module operating in said system management interrupt mode, said first restore system state module having access to said isolated memory and said non-isolated memory, said first restore system state module writing information from said non-isolated memory into said isolated memory; and activating a second restore system state module, said second restore system state module operating in said nonprotected mode, said second restore system state module having access to said non-isolated memory, said second restore system state module writing information from a predetermined location on said nonvolatile mass storage device to said non-isolated memory.

18. The process as claimed in claim 17 further including the steps of:

determining if the contents of a battery backed random access memory is valid.

19. The process as claimed in claim 17 further including the step of:

transferring control from said first restore system state module to said second restore system state module by modifying processor state information.

20. The process as claimed in claim 17 further including the step of:

transferring control from said second restore system state module to said first restore system state module by generating an interrupt.

21. The process as claimed in claim 17 further including the step of:

returning processing control to a previously executing program.

22. The process as claimed in claim 17 further including a step of resuming operation of said computer system from a low power mode, said step of resuming being performed without reading a complete saved system state image stored on said nonvolatile mass storage device.

* * * * *